US011230772B2

(12) United States Patent
Ono et al.

(10) Patent No.: US 11,230,772 B2
(45) Date of Patent: Jan. 25, 2022

(54) CARBON DIOXIDE ELECTROLYTIC DEVICE AND METHOD OF ELECTROLYZING CARBON DIOXIDE

(71) Applicant: KABUSHIKI KAISHA TOSHIBA, Minato-ku (JP)

(72) Inventors: Akihiko Ono, Kita (JP); Yuki Kudo, Yokohama (JP); Ryota Kitagawa, Setagaya (JP); Masakazu Yamagiwa, Yokohama (JP); Jun Tamura, Chuo (JP); Satoshi Mikoshiba, Yamato (JP); Yoshitsune Sugano, Kawasaki (JP); Asahi Motoshige, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 181 days.

(21) Appl. No.: 16/561,705

(22) Filed: Sep. 5, 2019

(65) Prior Publication Data

US 2020/0002822 A1 Jan. 2, 2020

Related U.S. Application Data

(63) Continuation of application No. PCT/JP2018/033692, filed on Sep. 11, 2018.

(30) Foreign Application Priority Data

Mar. 22, 2018 (JP) ............................ JP2018-054095

(51) Int. Cl.
*C25B 15/08* (2006.01)
*C25B 9/05* (2021.01)
(Continued)

(52) U.S. Cl.
CPC ................. *C25B 1/04* (2013.01); *C25B 1/23* (2021.01); *C25B 3/26* (2021.01); *C25B 9/05* (2021.01);
(Continued)

(58) Field of Classification Search
CPC ................ C25B 1/23; C25B 3/25; C25B 3/26
See application file for complete search history.

(56) References Cited

U.S. PATENT DOCUMENTS 9,157,158 B2 10/2015 Deguchi et al.
2016/0273100 A1 9/2016 Shibuya
(Continued)

FOREIGN PATENT DOCUMENTS

JP 2004-223497 A 8/2004
JP 2005-161207 A 6/2005
(Continued)

OTHER PUBLICATIONS

Jeanty et al, Upscaling and continuous operation of electrochemical CO2 to CO conversion in aqueous solutions on silver gas diffusion electrodes, Journal of CO2 Utilization, vol. 24, Mar. 2018, pp. 454-462 (Year: 2018).*
(Continued)

*Primary Examiner* — Harry D Wilkins, III
(74) *Attorney, Agent, or Firm* — Oblon, McClelland, Maier & Neustadt, L.L.P.

(57) ABSTRACT

A carbon dioxide electrolytic device includes: an electrolysis cell; a sensor acquiring data indicating a concentration of a first product containing a carbon compound in an anode flow path of the electrolysis cell; a power controller to apply a voltage between an anode and a cathode of the electrolysis cell; a refresh material source including a gas source to supply a gaseous substance to at least one selected from the group consisting of the anode and cathode flow paths, and a solution supply source to supply a rinse solution to at least one selected from the group consisting of the anode and cathode flow paths; and a controller programmed to stop supply of carbon dioxide and an electrolytic solution, and supply the rinse solution to at least one selected from the
(Continued)

group consisting of the anode and cathode flow paths from the refresh material source, in accordance with the data.

15 Claims, 13 Drawing Sheets

(51) Int. Cl.

| | |
|---|---|
| ***C25B 9/23*** | (2021.01) |
| ***C25B 1/23*** | (2021.01) |
| ***C25B 3/26*** | (2021.01) |
| ***C25B 15/029*** | (2021.01) |
| ***C25B 1/04*** | (2021.01) |
| ***C25B 15/02*** | (2021.01) |
| ***C25B 9/73*** | (2021.01) |
| ***C25B 9/65*** | (2021.01) |

(52) U.S. Cl.

CPC .................. *C25B 9/23* (2021.01); *C25B 9/65* (2021.01); *C25B 9/73* (2021.01); *C25B 15/02* (2013.01); *C25B 15/029* (2021.01); *C25B 15/08* (2013.01)

(56) References Cited

U.S. PATENT DOCUMENTS

| | | | | |
|---|---|---|---|---|
| 2017/0271089 | A1 | 9/2017 | Ono et al. | |
| 2018/0127886 | A1* | 5/2018 | Park | C25B 1/04 |
| 2018/0265440 | A1 | 9/2018 | Kudo et al. | |
| 2018/0274109 | A1 | 9/2018 | Kudo et al. | |
| 2019/0127865 | A1* | 5/2019 | Li | C25B 9/23 |
| 2020/0087233 | A1* | 3/2020 | Ono | C25B 3/26 |
| 2021/0002775 | A1* | 1/2021 | Matsumoto | C25B 9/19 |
| 2021/0079541 | A1* | 3/2021 | Yamagiwa | C25B 15/08 |

FOREIGN PATENT DOCUMENTS

| | | | |
|---|---|---|---|
| JP | 2012-112001 | A | 6/2012 |
| JP | 2014-210982 | A | 11/2014 |
| JP | 2017-172033 | A | 9/2017 |
| JP | 2018-150595 | A | 9/2018 |
| JP | 2018-154901 | A | 10/2018 |
| WO | WO 2014/208097 | A1 | 12/2014 |

OTHER PUBLICATIONS

Kopljar et al, Electrochemical reduction of CO2 to formate at high current density using gas diffusion electrodes, Journal of Applied Electrochemistry, vol. 44, Aug. 2014, pp. 1107-1116 (Year: 2014).*

Li et al, Development of a continuous reactor for the electro-reduction of carbon dioxide to formate—Part 2: Scale-up, Journal of Applied Eletrochemistry, vol. 37, Jul. 2007, pp. 1107-1117 (Year: 2007).*

Li et al, Bipolar Membranes Inhibit Product Crossover in CO2 Electrolysis Cells, Advanced Sustainable Systems, vol. 2, No. 4, Mar. 2, 2018, 170187 (pp. 1-5) (Year: 2018).*

Zhang et al, Crossover of liquid products from electrochemical CO2 reduction through gas diffusion electrode and anion exchange membrane, Journal of Catalysis, vol. 385, May 2020, pp. 140-145 (Year: 2020).*

International Search Report dated Dec. 4, 2018 in PCT/JP2018/033692 filed Sep. 11, 2018 (with English Translation of Categories of Cited Documents).

Written Opinion dated Dec. 4, 2018 in PCT/JP2018/033692 filed Sep. 11, 2018.

Zengcai Liu et al. "Electrochemical generation of syngas from water and carbon dioxide at industrially important rates," Journal of CO2 Utilization vol. 15.pp. 50-56.(2016).

Sinchao Ma, et al. "Efficient Electrochemical Flow System with Improved Anode for the Conversion of CO2 to CO," Journal of the Electrochemical Society, 161 (10) F1124-F1131 (2014).

* cited by examiner 1
2
11
12
13
21
22
23
24
30
40
70
100
101
102
103
104
105
200
201
202
203
204
205
206
300
301
302
303
304
400
401
402
500
501
502
503
504
600
601
700
710
711
712
720
721
722

1X
300
301
302
303
700
712
722
711
721
710
720
205
204
203
206
202
201
200
2X
54B
56B
22
52
57
55A
55B
56A
54A
11
51
100
105
104
103
102
101
70
40
504
503
502
501
500
304
401
402
400
600
601

1Y
2Y
11
12
13
22
23
24
30
40
70
100
101
102
103
104
105
300
301
302
303
304
400
401
402
500
501
502
503
504
600
601
700
710
711
712
720
721
722

CARBON DIOXIDE ELECTROLYTIC DEVICE AND METHOD OF ELECTROLYZING CARBON DIOXIDE

CROSS-REFERENCE TO RELATED APPLICATIONS

This application is a continuation of prior International Application No. PCT/JP2018/033692 filed on Sep. 11, 2018; the entire contents of all of which are incorporated herein by reference.

FIELD

Embodiments described herein relate generally to a carbon dioxide electrolytic device and a method of electrolyzing carbon dioxide.

BACKGROUND

In recent years, depletion of fossil fuel such as petroleum or coal has been concerned, and expectation for sustainably-usable renewable energy has been rising. As the renewable energy, a solar cell, wind power generation, and the like can be cited. Because a power generation amount of these depends on weather and a natural situation, there is a problem that it is difficult to realize stable supply of electric power. For this reason, there has been made an attempt to store the electric power generated by the renewable energy in a storage battery, to thereby stabilize the electric power. However, when the electric power is stored, there are problems that a cost is required for the storage battery, and a loss occurs at a time of the storage.

With respect to such points, attention is focused on a technology in which water electrolysis is performed by using the electric power generated by the renewable energy to produce hydrogen ($H_2$) from water, or carbon dioxide ($CO_2$) is electrochemically reduced to be converted into a chemical substance (chemical energy) such as a carbon compound such as carbon monoxide (CO), formic acid (HCOOH), methanol ($CH_3OH$), methane ($CH_4$), acetic acid ($CH_3COOH$), ethanol ($C_2H_5OH$), ethane ($C_2H_6$), or ethylene ($C_2H_4$). When these chemical substances are stored in a cylinder or a tank, there are advantageous points that a storage cost of energy can be reduced, and a storage loss is also small, when compared to a case where the electric power (electric energy) is stored in the storage battery.

As a carbon dioxide electrolytic device, for example, a structure in which an Ag nanoparticle catalyst is used as a cathode, a cathode solution and $CO_2$ gas are brought into contact with the cathode, and an anode solution is brought into contact with an anode is being studied. As a concrete configuration of the electrolytic device, for example, there can be cited a configuration which includes a cathode solution flow path disposed along one surface of the cathode, a $CO_2$ gas flow path disposed along the other surface of the cathode, an anode solution flow path disposed along one surface of an anode, and a separator disposed between the cathode solution flow path and the anode solution flow path. When a reaction of producing, for example, CO from $CO_2$ is performed for a long period of time by using the electrolytic device having such a configuration and, for example, by making a constant current flow through the cathode and the anode, there is a problem that a deterioration over time of a cell performance such that a production amount of CO is reduced or a cell voltage is increased occurs. For this reason, there has been demanded a carbon dioxide electrolytic device capable of suppressing the deterioration over time of the cell performance.

DETAILED DESCRIPTION

A carbon dioxide electrolytic device of an embodiment includes: an electrolysis cell including a cathode to reduce a first substance containing carbon dioxide and thus produce a first product containing a carbon compound, an anode to oxidize a second substance containing water or hydroxide ions and thus produce a second product containing oxygen, a cathode flow path facing the cathode, an anode flow path facing the anode, and a separator separating the anode and the cathode; a carbon dioxide source to supply the carbon dioxide to the cathode flow path; a solution source to supply an electrolytic solution containing the water to the anode flow path; a sensor to acquire data indicating a concentration of the first product in the anode flow path; a power controller to apply a voltage between the anode and the cathode; a refresh material source including a gas source supplying a gaseous substance to at least one selected from the group consisting of the anode and cathode flow paths, and a solution supply source to supply a rinse solution to at least one selected from the group consisting of the anode and cathode flow paths; and a controller programmed to stop the supply of the carbon dioxide and the electrolytic solution, and supply the rinse solution to at least one selected from the group consisting of the anode and cathode flow paths from the refresh material source, in accordance with the data.

Hereinafter, a carbon dioxide electrolytic device of an embodiment will be described with reference to the drawings. In each embodiment presented below, substantially the same components are denoted by the same reference signs, and a description thereof is sometimes partially omitted. The drawings are schematic, and a relationship between a thickness and a planar size, thickness proportions of the respective portions, and the like are sometimes different from actual ones.

First Embodiment

Figure 1:
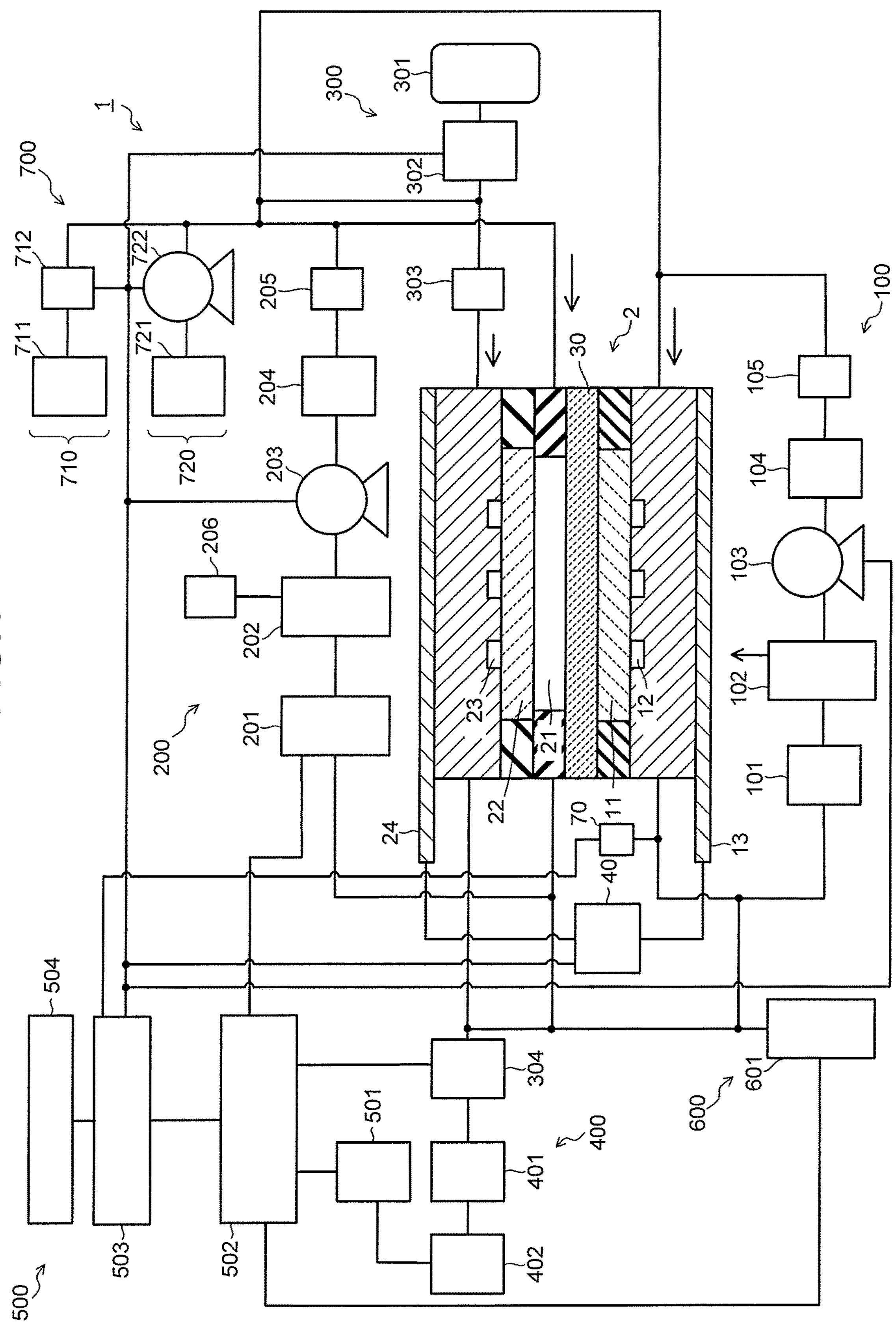
FIG. 1 is a view illustrating a carbon dioxide electrolytic device of a first embodiment.
Figure 2:
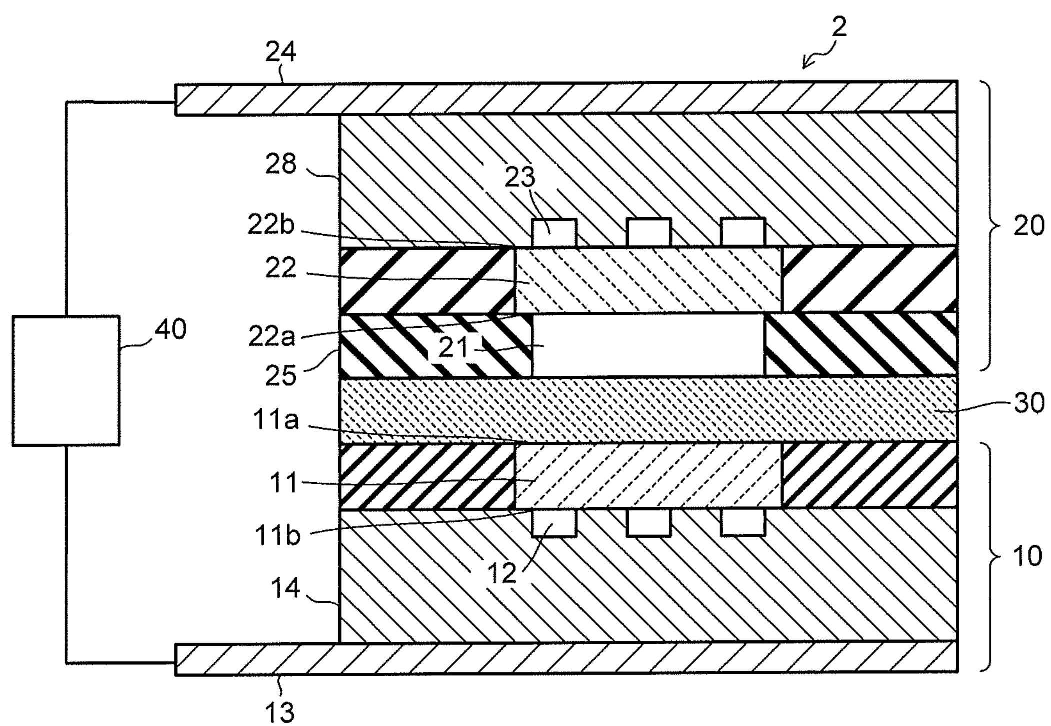
FIG. 2 is a sectional view illustrating an electrolysis cell of the carbon dioxide electrolytic device illustrated in FIG. 1.

FIG. 1 is a view illustrating a configuration of a carbon dioxide electrolytic device according to a first embodiment, and FIG. 2 is a sectional view illustrating a configuration of an electrolysis cell in the electrolytic device illustrated in FIG. 1. A carbon dioxide electrolytic device 1 illustrated in FIG. 1 includes an electrolysis cell 2, an anode solution supply system 100 which supplies an anode solution to the electrolysis cell 2, a cathode solution supply system 200 which supplies a cathode solution to the electrolysis cell 2, a gas supply system 300 which supplies carbon dioxide ($CO_2$) gas to the electrolysis cell 2, a product collection system 400 which collects a product produced by a reduction reaction in the electrolysis cell 2, a control system 500 which detects a type and a production amount of the collected product, and performs control of the product and control of a refresh operation, a waste solution collection system 600 which collects a waste solution of the cathode solution and the anode solution, and a refresh material source 700 which recovers an anode, a cathode, or the like of the electrolysis cell 2.

As illustrated in FIG. 2, the electrolysis cell 2 includes an anode part 10, a cathode part 20, and a separator 30. The anode part 10 includes an anode 11, an anode flow path 12 (anode solution flow path), and an anode current collector 13. The cathode part 20 includes a cathode flow path 21 (cathode solution flow path), a cathode 22, a cathode flow path 23 ($CO_2$ gas flow path), and a cathode current collector 24. Even though there is no cathode flow path 21 and the separator 30 and the cathode 22 are brought into contact with each other, a cell resistance is low, which is thus preferable. The separator 30 is disposed to separate the anode part 10 and the cathode part 20. The electrolysis cell 2 is sandwiched by a pair of support plates, which are not illustrated, and further tightened by bolts or the like. In FIG. 1 and FIG. 2, there is provided a power controller 40 which makes a current flow through the anode 11 and the cathode 22. The power controller 40 is connected via a current introduction member to the anode 11 and the cathode 22. The power controller 40 is not limited to a normal system power supply, battery, or the like, and may have a power source which supplies electric power generated by renewable energy such as a solar cell or wind power generation. Note that the power controller 40 may also have the aforementioned power source and a power controller or the like that adjusts an output of the aforementioned power source to control a voltage between the anode 11 and the cathode 22.

The anode 11 is an electrode (oxidation electrode) which causes an oxidation reaction of water ($H_2O$) in an anode solution as an electrolytic solution to produce oxygen ($O_2$) or hydrogen ions ($H^+$), or causes an oxidation reaction of hydroxide ions ($OH^-$) produced in the cathode part 20 to produce oxygen ($O_2$) or water ($H_2O$). The anode 11 preferably has a first surface 11*a* which is brought into contact with the separator 30, and a second surface 11*b* which faces the anode flow path 12. The first surface 11*a* of the anode 11 is brought into close contact with the separator 30. The anode flow path 12 supplies the anode solution to the anode 11, and is formed of a pit (groove portion/concave portion) provided in a first flow path plate 14. The anode solution flows through inside the anode flow path 12 so as to be brought into contact with the anode 11. The anode current collector 13 is electrically brought into contact with a surface on a side opposite to the anode 11 of the first flow path plate 14 forming the anode flow path 12.

As described above, in the electrolysis cell 2 of the embodiment, the anode 11 and the separator 30 are brought into close contact with each other. In the anode 11, oxygen ($O_2$) is produced, and at this time, in a cell structure in which the separator is sandwiched by a cathode solution flow path and an anode solution flow path, air bubbles of oxygen ($O_2$) gas generated in the anode 11 stay in the anode solution flow path, and a cell resistance between the anode and the separator (ion exchange membrane or the like) increases, and this sometimes increases a voltage variation of the anode. With respect to a point as above, the anode flow path 12 is not disposed between the anode 11 and the separator 30, and the anode 11 and the separator 30 are brought into close contact with each other, thereby discharging oxygen gas generated in the anode 11 to the anode flow path 12 together with the anode solution. This makes it possible to prevent the oxygen gas from staying between the anode 11 and the separator 30, and it becomes possible to suppress a variation in a cell voltage due to the voltage variation of the anode.

Figure 3:
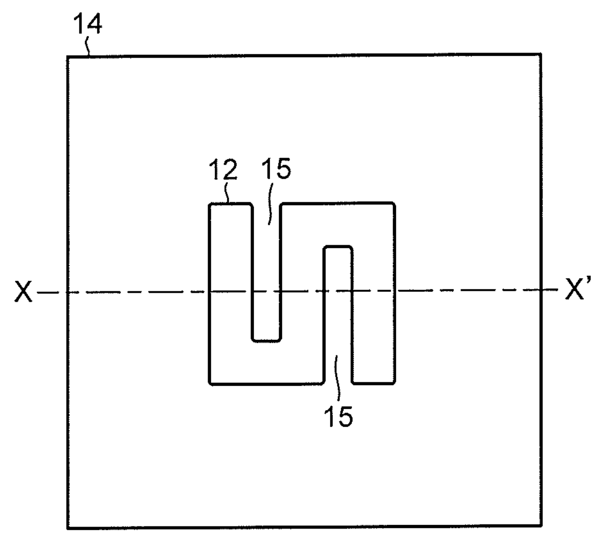
FIG. 3 is a view illustrating one example of an anode solution flow path in the electrolysis cell illustrated in FIG. 2.
Figure 3:
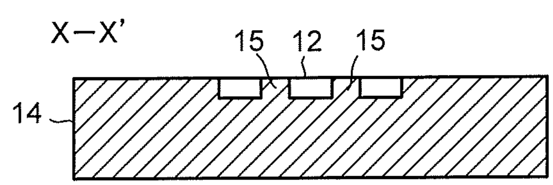

To the first flow path plate 14, there are provided a solution inlet and a solution outlet whose illustrations are omitted, and the anode solution is introduced and discharged by the anode solution supply system 100 via these solution inlet and solution outlet. It is preferable to use a material having low chemical reactivity and high conductivity for the first flow path plate 14. As such a material, there can be cited a metal material such as Ti or SUS, carbon, or the like. It is preferable that the anode flow path 12 is provided with a plurality of lands (convex portion) 15, as illustrated in FIG. 3. The lands 15 are provided for mechanical retention and electrical continuity. The lands 15 are preferably provided in an alternate manner for uniformizing the flow of the anode solution. Since the lands 15 as above are provided, the anode flow path 12 meanders. In addition, also for the purpose of realizing good discharge of the anode solution containing oxygen ($O_2$) gas mixed therein, it is preferable that the lands 15 are provided in an alternate manner to the anode flow path 12 to make the anode flow path 12 meander.

It is preferable that the anode 11 is mainly composed of a catalyst material (anode catalyst material) capable of oxidizing water ($H_2O$) to produce oxygen or hydrogen ions or oxidizing hydroxide ions ($OH^-$) to produce water or oxygen, and capable of reducing an overvoltage in such a reaction. As such a catalyst material, there can be cited a metal such as platinum (Pt), palladium (Pd), or nickel (Ni), an alloy or an intermetallic compound containing the above metals, a binary metal oxide such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), or a lanthanum oxide (La—O), a ternary metal oxide such as Ni—Co—O, Ni—Fe—O, La—Co—O, Ni—La—O, or Sr—Fe—O, a quaternary metal oxide such as Pb—Ru—Ir—O or La—Sr—Co—O, or a metal complex such as a Ru complex or an Fe complex.

The anode 11 includes a base material having a structure capable of making the anode solution or ions move between the separator 30 and the anode flow path 12, for example, a porous structure such as a mesh material, a punching material, a porous body, or a metal fiber sintered body. The base material may be composed of a metal such as titanium (Ti), nickel (Ni), or iron (Fe), or a metal material such as an alloy (for example, SUS) containing at least one of these metals, or may be composed of the above-described anode catalyst material. When an oxide is used as the anode catalyst material, it is preferable to form a catalyst layer in a manner that the anode catalyst material is adhered to or stacked on a surface of the base material made of the above-described metal material. The anode catalyst material preferably has nanoparticles, a nanostructure, a nanowire, or the like for the purpose of increasing the oxidation reaction. The nanostructure is a structure in which nanoscale irregularities are formed on a surface of the catalyst material.

The cathode 22 is an electrode (reduction electrode) which causes a reduction reaction of carbon dioxide ($CO_2$) or a reduction reaction of a carbon compound produced thereby to produce a carbon compound such as carbon monoxide (CO), methane ($CH_4$), ethane ($C_2H_6$), ethylene ($C_2H_4$), methanol ($CH_3OH$), ethanol ($C_2H_5OH$), or ethylene glycol ($C_2H_6O_2$). In the cathode 22, there is a case where a side reaction in which hydrogen ($H_2$) is produced by a reduction reaction of water ($H_2O$) is caused simultaneously with the reduction reaction of carbon dioxide ($CO_2$). The cathode 22 has a first surface 22*a* facing the cathode flow path 21, and a second surface 22*b* facing the cathode flow path 23. The cathode flow path 21 is disposed between the cathode 22 and the separator 30 so that the cathode solution as an electrolytic solution is brought into contact with the cathode 22 and the separator 30.

The cathode flow path 21 is formed of an opening portion provided in a second flow path plate 25. For the second flow path plate 25, there are provided a solution inlet and a solution outlet whose illustrations are omitted, and the cathode solution is introduced and discharged by the cathode solution supply system 200 via these solution inlet and solution outlet. The cathode solution flows through inside the cathode flow path 21 so as to be brought into contact with the cathode 22 and the separator 30. It is preferable to use a material having low chemical reactivity and having no conductivity for the second flow path plate 25 forming the cathode flow path 21. As such a material, there can be cited an insulating resin material such as an acrylic resin, polyetheretherketone (PEEK), or a fluorocarbon resin.

Figure 4:
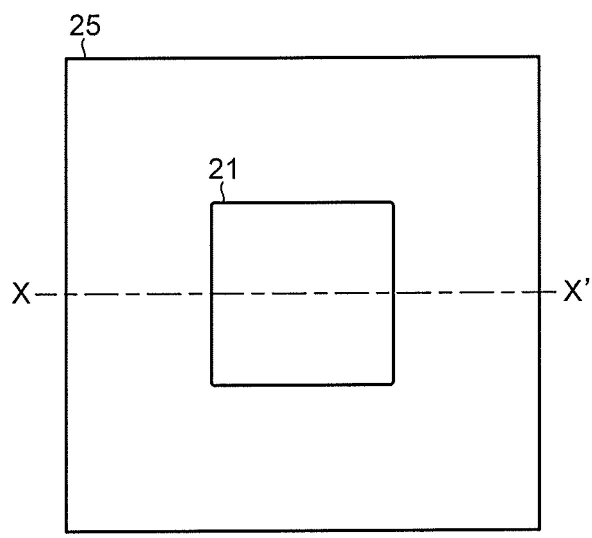
FIG. 4 is a view illustrating one example of a cathode solution flow path in the electrolysis cell illustrated in FIG. 2.
Figure 4:
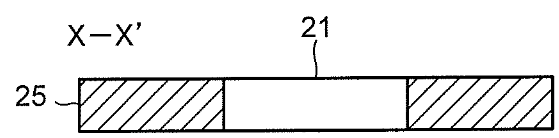
Figure 5:
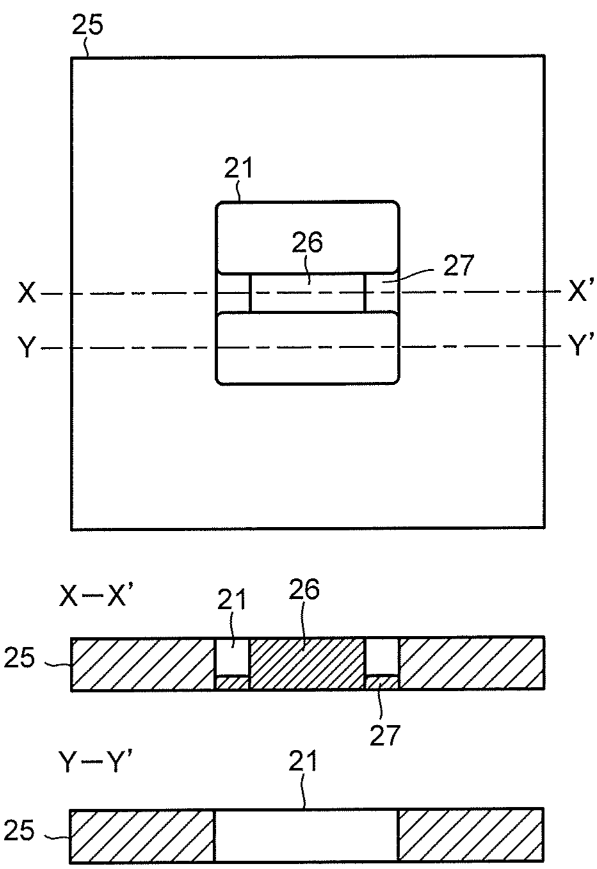
FIG. 5 is a view illustrating another example of the cathode solution flow path in the electrolysis cell illustrated in FIG. 2.

In the cathode 22, the reduction reaction of $CO_2$ occurs mainly in a portion which is brought into contact with the cathode solution. For this reason, it is preferable to apply an opening portion with a wide opening area to the cathode flow path 21, as illustrated in FIG. 4. However, in order to increase the mechanical retention and the electrical connectivity, it is also possible to provide a land (convex portion) 26 for the cathode flow path 21, as illustrated in FIG. 5. The land 26 of the cathode flow path 21 is provided at a center portion of the cathode flow path 21, and is retained to the second flow path plate 25 by a bridge portion 27 which is thinner than the land 26, in order not to prevent the flow of the cathode solution in the cathode flow path 21. When the land 26 is provided for the cathode flow path 21, the number of lands 26 is preferably small in order to reduce the cell resistance.

The cathode flow path 23 is formed of a pit (groove portion/concave portion) provided in a third flow path plate 28. It is preferable to use a material having low chemical reactivity and high conductivity for the third flow path plate 28 forming a $CO_2$ gas flow path. As such a material, there can be cited a metal material such as Ti or SUS, carbon, or the like. Note that for each of the first flow path plate 14, the second flow path plate 25, and the third flow path plate 28, an inlet and an outlet for a solution or gas, screw holes for tightening, and the like, whose illustrations are omitted, are provided. Further, in front of and behind each of the flow path plates 14, 25, and 28, packing whose illustration is omitted is sandwiched according to need.

Figure 6:
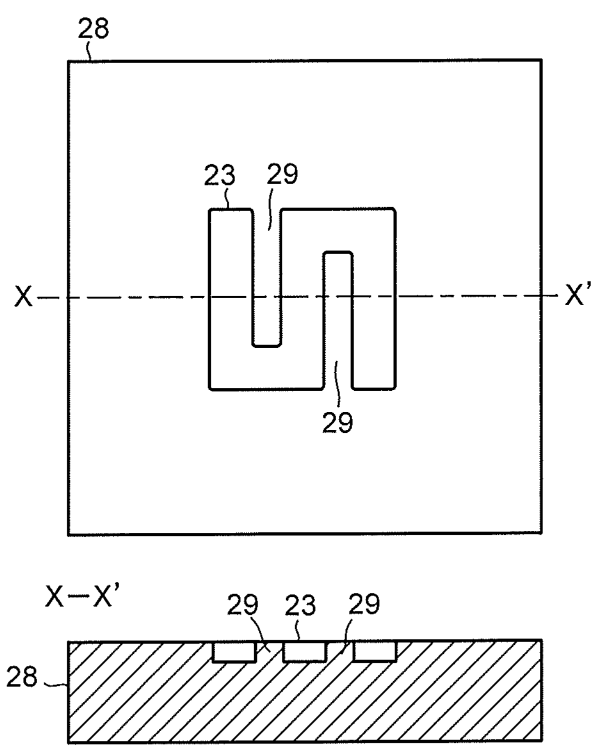
FIG. 6 is a view illustrating one example of a $CO_2$ gas flow path in the electrolysis cell illustrated in FIG. 2.

For the third flow path plate 28, a gas inlet and a gas outlet whose illustrations are omitted are provided, and $CO_2$ gas or gas containing $CO_2$ (sometimes collectively referred to simply as $CO_2$ gas) is introduced and discharged by the gas supply system 300 via these gas inlet and gas outlet. The $CO_2$ gas flows through inside the cathode flow path 23 so as to be brought into contact with the cathode 22. It is preferable that the cathode flow path 23 is provided with a plurality of lands (convex portion) 29, as illustrated in FIG. 6. The lands 29 are provided for mechanical retention and electrical continuity. The lands 29 are preferably provided in an alternate manner, which makes the cathode flow path 23 meander similarly to the anode flow path 12. The cathode current collector 24 is electrically brought into contact with a surface on a side opposite to the cathode 22 of the third flow path plate 28.

In the electrolysis cell 2 of the embodiment, by providing the lands 15 and 29 for the anode flow path 12 and the cathode flow path 23, it is possible to increase a contact area between the anode 11 and the first flow path plate 14 forming the anode flow path 12, and a contact area between the cathode 22 and the third flow path plate 28 forming the cathode flow path 23. Further, by providing the land 26 for the cathode flow path 21, it is possible to increase a contact area between the cathode 22 and the second flow path plate 25 forming the cathode flow path 21. These realize good electrical continuity between the anode current collector 13 and the cathode current collector 24 while enhancing mechanical retentivity of the electrolysis cell 2, and it becomes possible to improve reduction reaction efficiency of $CO_2$, and the like.

Figure 7:
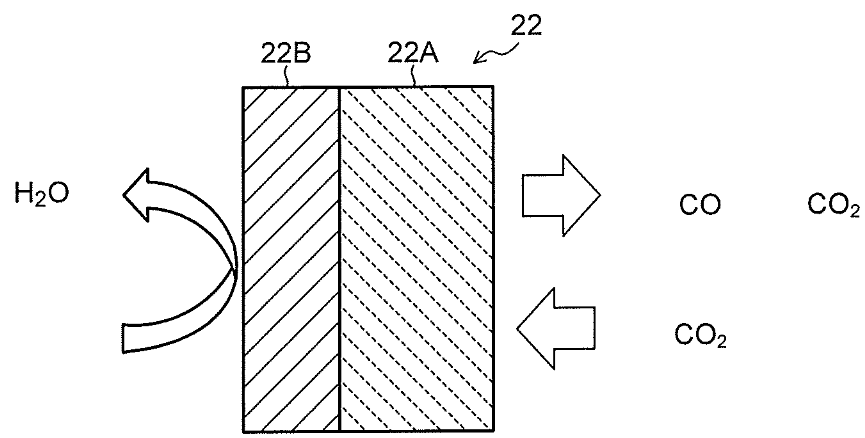
FIG. 7 is a view illustrating one example of a cathode in the electrolysis cell illustrated in FIG. 2.
Figure 8:
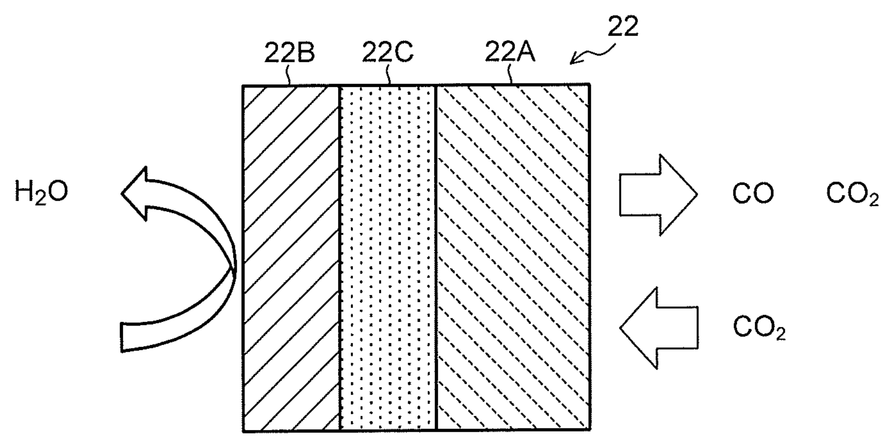
FIG. 8 is a view illustrating another example of the cathode in the electrolysis cell illustrated in FIG. 2.
Figure 9:
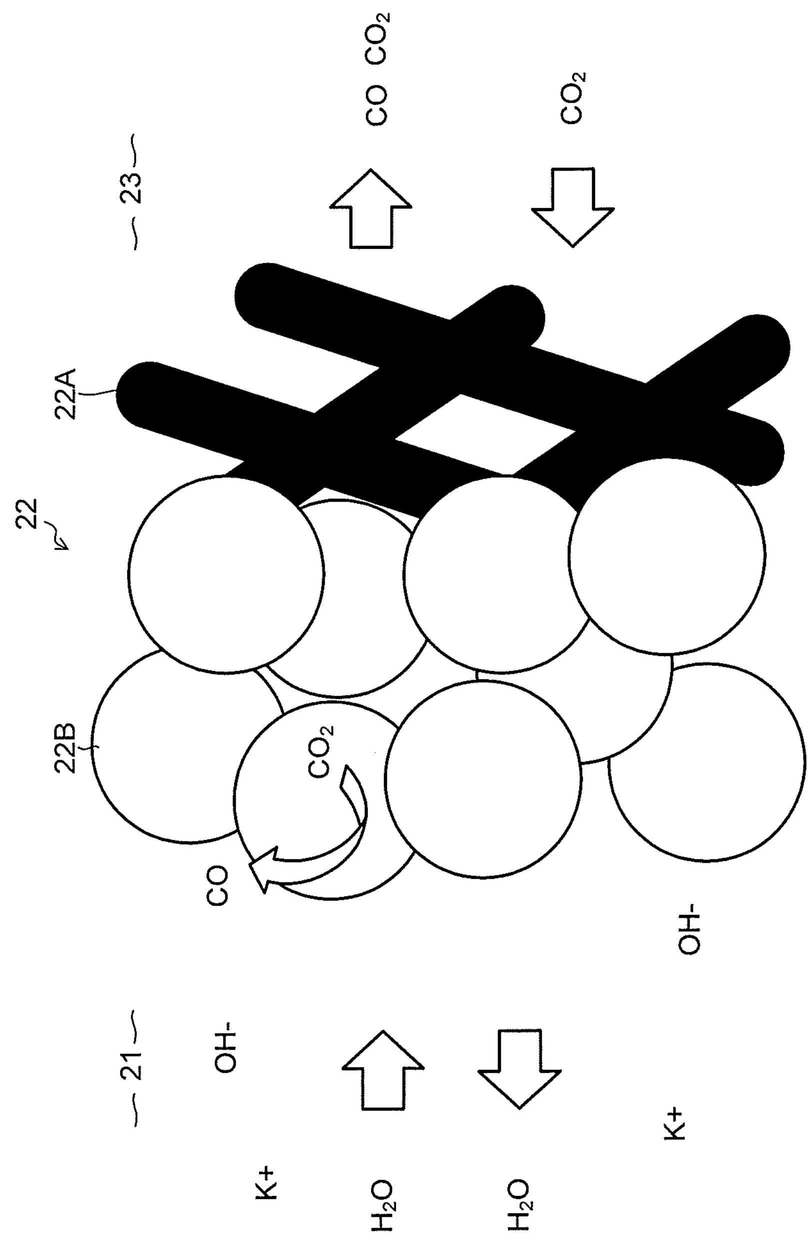
FIG. 9 is a view schematically illustrating a reaction in the cathode in the electrolysis cell illustrated in FIG. 2.

As illustrated in FIG. 7, the cathode 22 has a gas diffusion layer 22A and a cathode catalyst layer 22B provided on the gas diffusion layer 22A. As illustrated in FIG. 8, it is also possible that a porous layer 22C denser than the gas diffusion layer 22A is disposed between the gas diffusion layer 22A and the cathode catalyst layer 22B. As illustrated in FIG. 9, the gas diffusion layer 22A is disposed on the cathode flow path 23 side, and the cathode catalyst layer 22B is disposed on the cathode flow path 21 side. The cathode catalyst layer 22B may enter the gas diffusion layer 22A. The cathode catalyst layer 22B preferably has catalyst nanoparticles, a catalyst nanostructure, or the like. The gas diffusion layer 22A is formed of, for example, carbon paper, carbon cloth, or the like, and water repellent treatment is performed thereon. The porous layer 22C is formed of a porous body whose pore size is smaller than that of the carbon paper or the carbon cloth.

As illustrated in a schematic view in FIG. 9, in the cathode catalyst layer 22B, the cathode solution or ions are supplied and discharged from the cathode flow path 21. In the gas diffusion layer 22A, the $CO_2$ gas is supplied and a product obtained by the reduction reaction of the $CO_2$ gas is discharged from the cathode flow path 23. By previously performing moderate water repellent treatment on the gas diffusion layer 22A, the $CO_2$ gas reaches the cathode catalyst layer 22B mainly through gas diffusion. The reduction reaction of $CO_2$ or the reduction reaction of a carbon compound produced thereby occurs in the vicinity of a boundary between the gas diffusion layer 22A and the cathode catalyst layer 22B or in the vicinity of the cathode catalyst layer 22B which enters the gas diffusion layer 22A, a gaseous product is discharged mainly from the cathode flow path 23, and a liquid product is discharged mainly from the cathode flow path 21.

The cathode catalyst layer 22B is preferably composed of a catalyst material (cathode catalyst material) capable of reducing carbon dioxide to produce a carbon compound, capable of reducing the carbon compound produced thereby to produce a carbon compound according to need, and capable of reducing an overvoltage in the above reaction. As such a material, there can be cited a metal such as gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), or tin (Sn), a metal material such as an alloy or an intermetallic compound containing at least one of the above metals, a carbon material such as carbon (C), graphene, CNT (carbon nanotube), fullerene, or ketjen black, or a metal complex such as a Ru complex or a Re complex. The cathode catalyst layer 22B can employ various shapes such as a plate shape, a mesh shape, a wire shape, a particle shape, a porous shape, a thin film shape, and an island shape.

The cathode catalyst material composing the cathode catalyst layer 22B preferably has nanoparticles of the above-described metal material, a nanostructure of the metal material, a nanowire of the metal material, or a composite body in which the nanoparticles of the above-described metal material are supported by a carbon material such as carbon particles, a carbon nanotube, or graphene. By applying catalyst nanoparticles, a catalyst nanostructure, a catalyst nanowire, a catalyst nano-support structure, or the like as the cathode catalyst material, it is possible to increase reaction efficiency of the reduction reaction of carbon dioxide in the cathode 22.

The separator 30 is formed of an ion exchange membrane or the like capable of making ions move between the anode 11 and the cathode 22, and capable of separating the anode part 10 and the cathode part 20. As the ion exchange membrane, it is possible to use, for example, a cation exchange membrane such as Nafion or Flemion, or an anion exchange membrane such as Neosepta or Selemion. As will be described later, when an alkaline solution is used as the anode solution and the cathode solution, and it is assumed that hydroxide ions ($OH^-$) move mainly, the separator 30 is preferably formed of the anion exchange membrane. However, other than the ion exchange membrane, it is also possible to apply a glass filter, a porous polymeric membrane, a porous insulating material, or the like to the separator 30, as long as they are a material capable of making ions move between the anode 11 and the cathode 22.

Each of the anode solution and the cathode solution as the electrolytic solution is preferably a solution containing at least water ($H_2O$). Because carbon dioxide ($CO_2$) is supplied from the cathode flow path 23, the cathode solution may contain or need not contain carbon dioxide ($CO_2$). To the anode solution and the cathode solution, the same solution may be applied or different solutions may be applied. As a solution containing $H_2O$ used as the anode solution and the cathode solution, an aqueous solution containing an arbitrary electrolyte can be cited. As the aqueous solution containing the electrolyte, there can be cited, for example, an aqueous solution containing at least one selected from a hydroxide ion ($OH^-$), a hydrogen ion ($H^+$), a potassium ion ($K^+$), a sodium ion ($Na^+$), a lithium ion ($Li^+$), a chloride ion ($Cl^-$), a bromide ion ($Br^-$), an iodide ion ($I^-$), a nitrate ion ($NO_3^-$), a sulfate ion ($SO_4^{2-}$), a phosphate ion ($PO_4^{2-}$), a borate ion ($BO_3^{3-}$), and a hydrogen carbonate ion ($HCO_3^-$). In order to reduce an electrical resistance of the electrolytic solution, it is preferable to use, as the anode solution and the cathode solution, an alkaline solution in which an electrolyte such as a potassium hydroxide or a sodium hydroxide is dissolved in high concentration.

For the cathode solution, it is also possible to use an ionic liquid which is made of salts of cations such as imidazolium ions or pyridinium ions and anions such as $BF_4^-$ or $PF_6^-$ and which is in a liquid state in a wide temperature range, or its aqueous solution. As another cathode solution, there can be cited an amine solution of ethanolamine, imidazole, pyridine, or the like, or an aqueous solution thereof. As amine, any of primary amine, secondary amine, and tertiary amine is applicable.

To the anode flow path 12 of the anode part 10, the anode solution is supplied from the anode solution supply system 100. The anode solution supply system 100 circulates the anode solution so that the anode solution flows through inside the anode flow path 12. The anode solution supply system 100 has a pressure controller 101, an anode solution tank 102, a flow rate controller (pump) 103, a reference electrode 104, and a pressure gauge 105, and is configured to make the anode solution circulate in the anode flow path 12. The anode solution tank 102 is connected to a not-illustrated gas component collection unit which collects a gas component such as oxygen ($O_2$) contained in the circulating anode solution. The anode solution is introduced into the anode flow path 12 after a flow rate and a pressure thereof are controlled in the pressure controller 101 and the flow rate controller 103.

To the cathode flow path 21 of the cathode part 20, the cathode solution is supplied from the cathode solution supply system 200. The cathode solution supply system 200 circulates the cathode solution so that the cathode solution flows through inside the cathode flow path 21. The cathode solution supply system 200 has a pressure controller 201, a cathode solution tank 202, a flow rate controller (pump) 203, a reference electrode 204, and a pressure gauge 205, and is configured to make the cathode solution circulate in the cathode flow path 21. The cathode solution tank 202 is connected to a gas component collection unit 206 which collects a gas component such as carbon monoxide (CO) contained in the circulating cathode solution. The cathode solution is introduced into the cathode flow path 21 after a flow rate and a pressure thereof are controlled in the pressure controller 201 and the flow rate controller 203.

To the cathode flow path 23, the $CO_2$ gas is supplied from the gas supply system 300. The gas supply system 300 has a $CO_2$ gas cylinder 301, a flow rate controller 302, a pressure gauge 303, and a pressure controller 304. The $CO_2$ gas is introduced into the cathode flow path 23 after a flow rate and a pressure thereof are controlled in the flow rate controller 302 and the pressure controller 304. The gas supply system 300 is connected to the product collection system 400 which collects a product in the gas flowed through the cathode flow path 23. The product collection system 400 has a gas/liquid separation unit 401 and a product collection unit 402. A reduction product such as CO or $H_2$ contained in the gas flowed through the cathode flow path 23 is accumulated in the product collection unit 402 via the gas/liquid separation unit 401.

The anode solution and the cathode solution circulate in the anode flow path 12 and the cathode flow path 21 at a time of an electrolytic reaction operation, as described above. At a time of a refresh operation of the electrolysis cell 2 to be described later, the anode solution and the cathode solution are discharged to the waste solution collection system 600 so that the anode 11, the anode flow path 12, the cathode 22, the cathode flow path 21, and the like are exposed from the anode solution and the cathode solution. The waste solution collection system 600 has a waste solution collection tank 601 connected to the anode flow path 12 and the cathode flow path 21. Waste solutions of the anode solution and the cathode solution are collected in the waste solution collection tank 601 by opening and closing not-illustrated valves. The opening and closing of the valves, or the like is controlled collectively by the control system 500. The waste solution collection tank 601 also functions as a collection unit of the rinse solution supplied from the refresh material source 700. Further, a gaseous substance supplied from the refresh material source 700 and containing a part of a liquid substance, is also collected by the waste solution collection tank 601 according to need.

The refresh material source 700 includes a gaseous substance supply system 710 and a rinse solution supply system 720. Note that the rinse solution supply system 720 can also be omitted according to circumstances. The gaseous substance supply system 710 has a gas tank 711 to be a supply source of a gaseous substance such as air, carbon dioxide, oxygen, nitrogen, or argon, and a pressure controller 712 which controls a supply pressure of the gaseous substance. The rinse solution supply system 720 has a rinse solution tank 721 to be a supply source of a rinse solution such as water and a flow rate controller (pump) 722 which controls a supply flow rate or the like of the rinse solution. The gaseous substance supply system 710 and the rinse solution supply system 720 are connected via pipes to the anode flow path 12, the cathode flow path 21, and the cathode flow path 23. The gaseous substance and the rinse solution are supplied to each of the flow paths 12, 21, and 23 by opening and closing not-illustrated valves. The opening and closing of the valves, or the like is controlled collectively by the control system 500.

The electrolytic device 1 further includes a sensor 70. The sensor 70 measures a concentration of a product caused by the reduction reaction (reduction product) which moves from the cathode part 20 to the anode flow path 12 due to a failure of the electrolysis cell 2, or the like, to thereby acquire concentration data. This makes it possible to measure the concentration of the reduction product such as hydrogen or carbon monoxide which moves from the cathode part 20 to the anode part 10. The sensor 70 may be provided outside (around) or inside the anode flow path 12. In addition, the sensor 70 preferably measures the concentration of the aforementioned reduction product at the solution outlet of the anode flow path 12. The concentration data is transmitted to a refresh controller 503 connected to the sensor 70, and the refresh controller 503 controls the refresh operation to be described later in accordance with the concentration data.

As the sensor 70, for example, there can be cited a hydrogen gas sensor which measures a concentration of hydrogen gas, a carbon monoxide gas sensor which measures a concentration of carbon monoxide, or the like. As the sensor, a combustible material gas sensor can also be used as the hydrogen or CO sensor. When a so-called catalytic combustion type gas sensor is used, it is difficult to distinguish concentrations of hydrogen and CO from each other to thereby detect them, but they can be distinguished by combination with other cell data, pH, temperature, or another gas sensor concentration. As the sensor, there can also be cited a semiconductor sensor, an electrochemical sensor, a biosensor, and the like, and any system of the sensors is applicable, and combination thereof is arbitrary.

A part of the reduction product accumulated in the product collection unit 402 is sent to a reduction performance detection unit 501 of the control system 500. In the reduction performance detection unit 501, a production amount and a proportion of each product such as CO or $H_2$ in the reduction product, are detected. The detected production amount and proportion of each product are input into a data collection and controller 502 of the control system 500. Further, the data collection and controller 502 collects electrical data such as a cell voltage, a cell current, a cathode potential, and an anode potential, and data of pressures, pressure losses, and the like inside the anode solution flow path and the cathode solution flow path as part of a cell performance of the electrolysis cell 2, and transmits the data to a refresh controller 503.

The data collection and controller 502 is electrically connected, via bi-directional signal lines whose illustration is partially omitted, to the power controller 40, the pressure controller 101 and the flow rate controller 103 of the anode solution supply system 100, the pressure controller 201 and the flow rate controller 203 of the cathode solution supply system 200, the flow rate controller 302 and the pressure controller 304 of the gas supply system 300, and the pressure controller 712 and the flow rate controller 722 of the refresh material source 700, in addition to the reduction performance detection unit 501, and these are collectively controlled. Note that each pipe is provided with a not-illustrated valve, and an opening/closing operation of the valve is controlled by a signal from the data collection and controller 502. The data collection and controller 502 may also control operations of the aforementioned components at a time of an electrolysis operation, for example.

The refresh controller 503 is electrically connected, via bi-directional signal lines whose illustration is partially omitted, to the power controller 40, the flow rate controller 103 of the anode solution supply system 100, the flow rate controller 203 of the cathode solution supply system 200, the flow rate controller 302 of the gas supply system 300, and the pressure controller 712 and the flow rate controller 722 of the refresh material source 700, and these are collectively controlled. Note that each pipe is provided with a not-illustrated valve, and an opening/closing operation of the valve is controlled by a signal from the refresh controller 503. The refresh controller 503 may also control operations of the aforementioned components at a time of the electrolysis operation, for example. Further, it is also possible that the refresh controller 503 and the data collection and controller 502 are configured by one controller.

Figure 10:
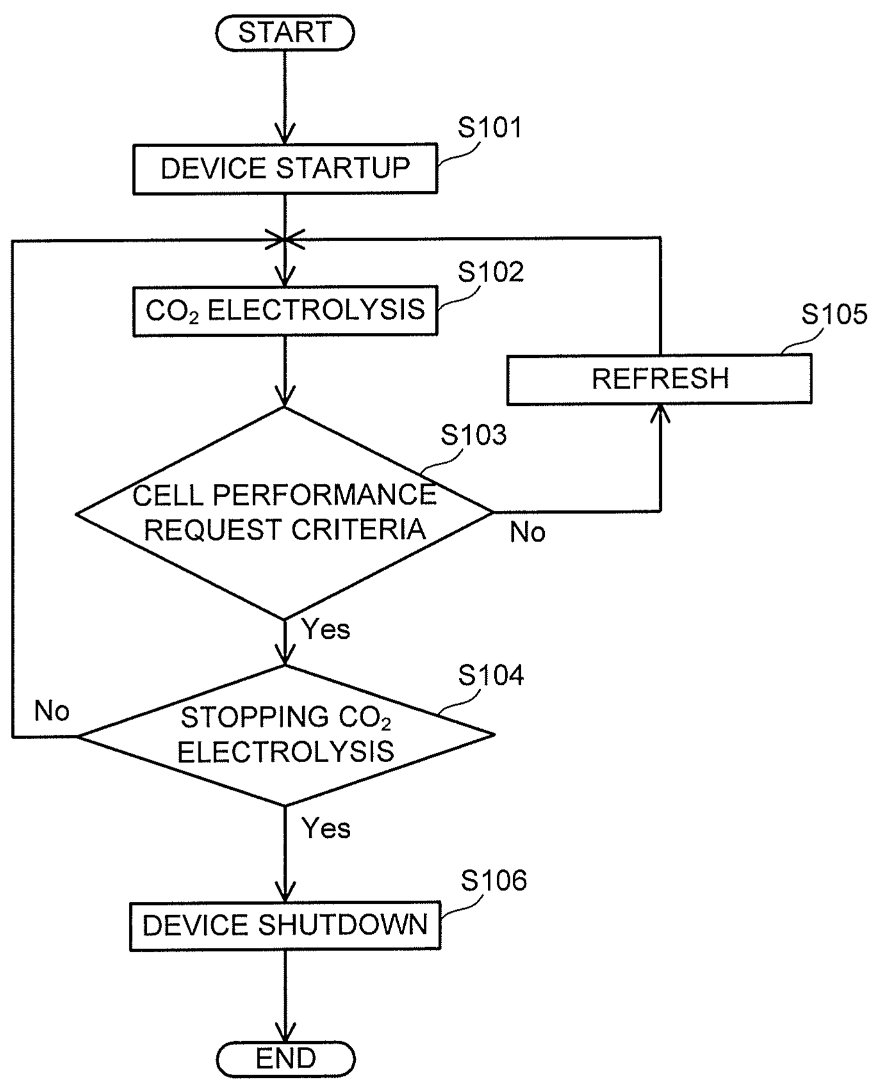
FIG. 10 is a chart illustrating an operation step of the carbon dioxide electrolytic device of the first embodiment.

A working operation of the carbon dioxide electrolytic device 1 of the embodiment will be described. First, as illustrated in FIG. 10, a start-up step S101 of the electrolytic device 1 is performed. In the start-up step S101 of the electrolytic device 1, the following operation is performed. In the anode solution supply system 100, a flow rate and a pressure are controlled by the pressure controller 101 and the flow rate controller 103, and the anode solution is introduced into the anode flow path 12. In the cathode solution supply system 200, a flow rate and a pressure are controlled by the pressure controller 201 and the flow rate controller 203, and the cathode solution is introduced into the cathode flow path 21. In the gas supply system 300, a flow rate and a pressure are controlled by the flow rate controller 302 and the pressure controller 304, and $CO_2$ gas is introduced into the cathode flow path 23.

Next, a $CO_2$ electrolysis operation step S102 is performed. In the $CO_2$ electrolysis operation step S102, application of an electrolytic voltage is started by the power controller 40 of the electrolytic device 1 after being subjected to the start-up step S101, and a current is supplied by applying the voltage between the anode 11 and the cathode 22. When the current is made to flow between the anode 11 and the cathode 22, an oxidation reaction in the vicinity of the anode 11 and a reduction reaction in the vicinity of the cathode 22 occur, which will be described below. Here, a case of producing carbon monoxide (CO) as the carbon compound is mainly described, but, the carbon compound as the reduction product of carbon dioxide is not limited to carbon monoxide, and may be other carbon compounds such as the above-described organic compounds. Further, as a reaction process caused by the electrolysis cell 2, there can be considered a case where hydrogen ions ($H^+$) are mainly produced and a case where hydroxide ions (OH) are mainly produced, but, it is not limited to either of these reaction processes.

First, the reaction process in a case of mainly oxidizing water ($H_2O$) to produce hydrogen ions ($H^+$) is described. When a current is supplied between the anode 11 and the cathode 22 from the power controller 40, an oxidation reaction of water ($H_2O$) occurs in the anode 11 which is brought into contact with the anode solution. Concretely, as presented in the following formula (1), $H_2O$ contained in the anode solution is oxidized, and oxygen ($O_2$) and hydrogen ions ($H^+$) are produced.

$$2H_2O \rightarrow 4H^+ + O_2 + 4e^- \quad (1)$$

$H^+$ produced in the anode 11 moves in the anode solution existing in the anode 11, the separator 30, and the cathode solution in the cathode flow path 21, and reaches the vicinity of the cathode 22. The reduction reaction of carbon dioxide ($CO_2$) occurs by electrons ($e^-$) in accordance with the current supplied from the power controller 40 to the cathode 22 and $H^+$ moved to the vicinity of the cathode 22. Concretely, as presented in the following formula (2), $CO_2$ supplied from the cathode flow path 23 to the cathode 22 is reduced, and CO is produced.

$$2CO_2 + 4H^+ + 4e^- \rightarrow 2CO + 2H_2O \quad (2)$$

Next, the reaction process in a case of mainly reducing carbon dioxide ($CO_2$) to produce hydroxide ions ($OH^-$) is described. When a current is supplied between the anode 11 and the cathode 22 from the power controller 40, in the vicinity of the cathode 22, water ($H_2O$) and carbon dioxide ($CO_2$) are reduced, and carbon monoxide (CO) and hydroxide ions ($OH^-$) are produced, as presented in the following formula (3). The hydroxide ions ($OH^-$) diffuse to the vicinity of the anode 11, and as presented in the following formula (4), the hydroxide ions (OH) are oxidized, and oxygen ($O_2$) is produced.

$$2CO_2 + 2H_2O + 4e^- \rightarrow 2CO + 4OH^- \quad (3)$$

$$4OH^- \rightarrow 2H_2O + O_2 + 4e^- \quad (4)$$

In the above-described reaction processes in the cathode 22, the reduction reaction of $CO_2$ is considered to occur in the vicinity of the boundary between the gas diffusion layer 22A and the cathode catalyst layer 22B, as described above. At this time, the cathode solution which flows through the cathode flow path 21 enters up to the gas diffusion layer 22A or the cathode catalyst layer 22B has excess water, which causes a trouble such that the production amount of CO obtained by the reduction reaction of $CO_2$ reduces or the cell voltage increases. The reduction in the cell performance of the electrolysis cell 2 as above is also caused by not only deviation of distribution of ions and residual gas in the vicinity of the anode 11 and the cathode 22, the excess water in the cathode catalyst layer 22B, and precipitation of an electrolyte in the cathode 22 and the anode 11, but also precipitation of an electrolyte in the anode flow path 12 and the cathode flow path 21, and the like.

Further, there is a case where the electrolysis operation causes precipitation of salts in the cathode flow path 21 or the gas diffusion layer 22A, which blocks the flow path or reduces the gas diffusibility, resulting in that the cell performance reduces. This is because ions move between the anode 11 and the cathode 22 via the separator 30 or the ion exchange membrane, and the ions react with the gas component. For example, when a potassium hydroxide solution is used as the anode solution, and carbon dioxide gas is used as the cathode gas, potassium ions move from the anode 11 to the cathode 22, and the ions react with carbon dioxide to produce salts of potassium hydrogen carbonate, potassium carbonate, or the like. In the cathode flow path 21 or the gas diffusion layer 22A, when an amount of the salts is equal to or less than the solubility, the salts precipitate in the cathode flow path 21 or the gas diffusion layer 22A. When the flow path is blocked, a uniform gas flow in the entire cell is prevented, and the cell performance lowers. In particular, when a plurality of cathode flow paths 21 are provided, the cell performance significantly lowers. Note that there is also a case where the performance of the cell itself is improved by partial increase in the gas flow rate and the like. This is because since a gas pressure is increased, the gas component or the like supplied to the catalyst increases or the gas diffusibility increases, which improves the cell performance. In order to detect the reduction in the cell performance as above, a step S103 which determines whether or not the cell performance satisfies the request criteria, is performed.

The data collection and controller 502 collects the production amount and the proportion of each product and the cell performance such as the cell voltage, the cell current, the cathode potential, the anode potential, the pressure inside the anode flow path 12, the pressure inside the cathode flow path 21 in the electrolysis cell 2 regularly or continuously, for example, as described above. Further, in the data collection and controller 502, the request criteria of the cell performance are previously set, and it is determined whether or not collected data satisfies the set request criteria. When the collected data satisfies the set request criteria, the $CO_2$ electrolysis operation S102 is continued without performing a $CO_2$ electrolysis stop (S104). When the collected data does not satisfy the set request criteria, a refresh operation step S105 is performed.

The cell performance collected by the data collection and controller 502 is defined by parameters such as, for example, an upper limit value of a cell voltage when a constant current is made to flow through the electrolysis cell 2, a lower limit value of a cell current when a constant voltage is applied to the electrolysis cell 2, and Faradaic efficiency of the carbon compound produced by the reduction reaction of $CO_2$. Here, the Faradaic efficiency is defined as a proportion of a current contributing to production of an intended carbon compound with respect to an entire current flowed through the electrolysis cell 2. In order to maintain electrolysis efficiency, the refresh operation step S105 may be performed when the upper limit value of the cell voltage when the constant current is made to flow reaches 150% or more, preferably 120% or more of a set value. Further, the refresh operation step S105 may be performed when the lower limit value of the cell current at a time of applying the constant voltage reaches 50% or less, preferably 80% or less of a set value. In order to maintain a production amount of the reduction product such as the carbon compound, the refresh operation step S105 may be performed when the Faradaic efficiency of the carbon compound becomes 50% or less, preferably 80% or less of a set value.

Regarding the determination of the cell performance, for example, when at least one parameter of the cell voltage, the cell current, the Faradaic efficiency of the carbon compound, the pressure inside the anode flow path 12, and the pressure inside the cathode flow path 21 does not satisfy the request criteria and/or the concentration data from the sensor 70 does not satisfy the request criteria, it is determined that the cell performance does not satisfy the request criteria, and the refresh operation step S105 is carried out. Further, it is also possible to set the request criteria of the cell performance by combining two or more of the aforementioned parameters. For example, it is also possible to perform the refresh operation step S105 when neither the cell voltage nor the Faradaic efficiency of the carbon compound satisfies the request criteria. The refresh operation step S105 is performed when at least one of the cell performance does not satisfy the request criteria. In order to stably perform the $CO_2$ electrolysis operation step S102, the refresh operation step S105 is preferably performed at an interval of one hour or more, for example.

If the request criteria of the cell performance are judged in accordance with only one of the cell voltage, the cell current, and the Faradaic efficiency of the carbon compound, when, even in a case where the cell performance improves or does not change, salts precipitate in the flow path or the gas diffusion layer to reduce the output, it is sometimes judged that the refresh is required. In the electrolytic device, it is important to suspect the reduction in the cell performance beforehand, and to perform the refresh operation at an optimum timing. Accordingly, in the electrolytic device of the embodiment, it is preferable that the pressure in the cell (the pressure inside the anode flow path 12, the pressure inside the cathode flow path 21, or the like) is set to one of the parameters for defining the request criteria, to thereby sense the precipitation of salts, and the refresh operation is performed.

Moreover, in the electrolytic device of the embodiment, the request criteria of the cell performance are judged in accordance with the concentration data from the sensor 70, namely the data of the concentration of the reduction product in the anode flow path 12. For example, when the concentration of the reduction product in the anode flow path 12 exceeds a reference value, a phenomenon in which the reduction product moves from the cathode 22 side to the anode 11 side (also referred to as crossover) is considered to be occurring. In the crossover, the product moves from the anode 11 to the cathode 22, or from the cathode 22 to the anode 11. When the separator 30 deteriorates or is broken, a movement amount (also referred to as a crossover amount) of the reduction product rapidly and significantly increases. In particular, when long-time operation is performed under the condition in which a pressure in the cathode flow path 23 rises due to operation in the presence of the precipitation of salts, the crossover is likely to occur. In addition, when the crossover amount is gradually increased under the similar operation condition, the separator 30 is considered to deteriorate. The aforementioned concentration data can also used as a criteria for time for replacement of the separator 30.

For example, when a case where the reduction reaction of $CO_2$ is performed in the cathode part 20 to produce CO gas is described, the produced CO gas passes through the separator 30 to move to the anode part 10. When such a phenomenon as described above occurs, the CO gas is detected from the outlet of the anode flow path 12. Since the anode part 10 is placed in oxidation environment, CO is sometimes changed into $CO_2$ again, but, due to selectivity of the anode catalyst or a flow reaction using the flow path, the CO gas is detected from the outlet of the anode flow path 12 without the reaction. In particular, differently from water electrolysis and a fuel cell, since the one mainly moved in the crossover is not hydrogen, a component derived from the reduction of $CO_2$ is very likely to be detected in relation to the selectivity of the anode catalyst, which makes it possible to confirm various cell conditions from the crossover phenomenon. When salts precipitate in the flow path, the pressure loss in the flow path increases, so that this phenomenon becomes more significant. Correspondingly, the more salts precipitate, the larger the crossover amount becomes, which increases a CO concentration in the anode flow path 12. When the precipitation of salts is detected from the crossover amount as described above, precipitates of the salts produced by the reaction through the cathode 22 are discharged by the rinse solution. Further, when a mass transfer amount is not changed even by the discharge of the salts, it is judged that a leak from the electrolysis cell 2 occurs.

When the electrolysis cell 2 mainly produces, for example, CO, in a case of hydrogen, it can be judged that the request criteria of the cell performance are not satisfied when a concentration of hydrogen rises up to at least 2 times and preferably 1.5 times or more as much as that at a normal time. For example, in a case of CO, it can be judged that the request criteria of the cell performance are not satisfied when a concentration of CO drops to at least 0.8 times or less and preferably 0.9 times or less as much as that at a normal time.

Because it is also considered that the carbon compound is produced and water is decomposed by the electrolysis cell 2, the aforementioned standard concentration is arbitrary. For example, when hydrogen and CO are produced at a ratio of 2:1, and methanol is created with the gases by a reactor, a criterion of a concentration change of the reduction product is different from the aforementioned criterion, it can be judged that the request criteria of the cell performance are not satisfied when concentrations of the hydrogen and the carbon compound rise up to at least 1.3 times or more and preferably 1.1 times or more as much as those at a normal time, or drop to at least 0.8 times or less and preferably 0.9 times or less as much as those at a normal time.

The Faradaic efficiency can also be estimated in accordance with the concentration data from the sensor 70. This makes it possible that one sensor detects the crossover amount and a gas leak and estimates the Faradaic efficiency. Note that by using a sensor which detects a concentration of carbon dioxide as the sensor 70, the crossover amount can also be measured. Because the $CO_2$ concentration is high, it has the advantage of being easily measured.

When the salts are detected, the salts are discharged by the rinse solution, but when the mass transfer amount is not changed even by the discharge of the salts, it is also possible to judge that a leak occurs in the electrolysis cell 2. The leak from the electrolysis cell 2 also includes, for example, a gas leak from between the cathode 22 and the cathode flow paths 21 and 23, or the like without being limited to a gas leak between the anode 11 and the cathode 22. This gas leak is likely to occur, for example, when the electrolysis cell 2 in which the salts have precipitated is operated under the condition that pressures in the cathode flow paths 21 and 23 are high, for a long time.

It is important in terms of safety to detect the gas leak from the electrolysis cell 2 outside, and providing the sensor 70 outside the electrolysis cell 2 makes it possible to measure the crossover amount, and detect the precipitation of salts, the deterioration or breakage of the separator 30, the leak in the anode flow path 12 and the cathode flow paths 21 and 23, and the leak from the electrolysis cell 2. By the sensor 70, a plurality of cell conditions can be confirmed, and a system advantageous in terms of costs and the system can be realized. Further, a combination at this time is free, and for example, there can be cited examples in which the hydrogen sensor is provided for the anode flow path 12 and the CO sensor is provided around the electrolysis cell 2, and in which the hydrogen sensor is provided for the anode flow path 12 and the set CO sensor is provided in the vicinity of the outlet of the anode flow path 12 and in the vicinity around the electrolysis cell 2. This makes it possible to detect the blocking of the flow path due to the precipitation of salts, for example.

The judgment regarding the necessity of the refresh operation is made in accordance with not only the cell voltage, the current value, and the sensing of salts in accordance with a pressure change in the cell, but also the performance of gas/liquid separation between the anode 11 and the cathode 22 when the anode 11 and the cathode 22 are separated by the separator 30, namely, a movement amount of the liquid or the gas between the anode 11 and the cathode 22, an amount of the product, a voltage difference relative to a reference electrode, an estimated value of the Faradaic efficiency from these parameters, and the like. The Faradaic efficiency from the respective parameter values and the necessity of the refresh operation can be comprehensively determined as judgment of the necessity of the refresh operation also from parameters to be described later, and any combination of respective values and any calculation method are applicable.

It is also possible to judge the necessity of the refresh operation in accordance with a flooding degree estimated from respective pieces of cell data, a pressure change, and the like in accordance with an operating method for detecting a flooding performance. Further, it is also possible to take an operating time of the electrolysis cell 2 into consideration. The operating time is not limited to an operating time after the operation is started, but may be an integrated value of the operating time so far, a duration, an operating time after the refresh operation, or further, a calculated value of multiplication between the integrated voltage value and time, or between the current value and the time, or the like, and any combination and calculation method thereof can be applied. Further, the calculated values of these combinations are preferable when compared to the judgment in accordance with simply the duration or the like, since a difference caused by the operating method of the electrolysis cell 2 is taken into consideration. Furthermore, it is also possible to use a variation value of the current or the voltage, a pH value and a change value of the electrolytic solution, oxygen generation amount and variation amount.

It is preferable that the operation of judging the necessity of the refresh operation is performed, and the judgment is made in accordance with the parameter such as a cell voltage at a time of the operation, since it is possible to accurately judge the necessity of the refresh operation, although the working operation time is reduced. Note that a judgment time of the necessity of the refresh operation in this case is preferably at least a half or less of a refresh operation time, more preferably ¼ or less of the refresh operation time, and ideally $1/10$ or less of the refresh operation time. Further, regarding the respective parameters for judging the necessity of the refresh operation, respective pieces of data of the electrolysis cell 2 are collected via an electronic network, required parameters are derived by the data collection and controllers 502 and analysis units 504 of a plurality of cells, through big data analysis, and analysis of machine learning or the like, the refresh controller 503 is made to update the request criteria of the cell performance defined by the respective parameters for judging the necessity of refresh, and it is possible to constantly perform the best refresh operation.

Figure 11:
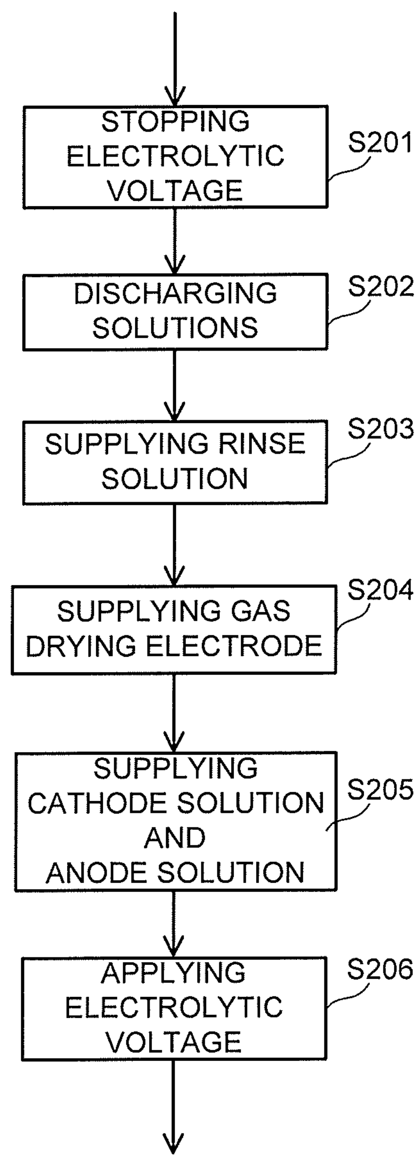
FIG. 11 is a chart illustrating a refresh step of the carbon dioxide electrolytic device of the first embodiment.

The refresh operation step S105 is performed according to a flow chart illustrated in FIG. 11, for example. First, the application of the electrolytic voltage performed by the power controller 40 is stopped, to thereby stop the reduction reaction of $CO_2$ (S201). At this time, the application of the electrolytic voltage does not necessarily have to be stopped. Next, the cathode solution and the anode solution are discharged from the cathode flow path 21 and the anode flow path 12 (S202). Next, the rinse solution is supplied to the cathode flow path 21 and the anode flow path 12 (S203), to thereby perform washing.

While the rinse solution is supplied, a refresh voltage may be applied between the anode 11 and the cathode 22. This makes it possible to remove ions and impurities adhered to the cathode catalyst layer 22B. When the refresh voltage is applied so as to perform mainly oxidation treatment, ions and impurities such as organic matters adhered to the surface of the catalyst are oxidized to be removed. Further, by performing this treatment in the rinse solution, it is possible to perform not only the refresh of the catalyst but also removal of ions substituted in an ion-exchange resin in a case of using the ion exchange membrane as the separator 30.

The refresh voltage is preferably not less than −2.5 V nor more than 2.5 V, for example. Since energy is used for the refresh operation, the range of the refresh voltage is preferably as narrow as possible, and the range is more preferably not less than −1.5 V nor more than 1.5 V, for example. The refresh voltage may be cyclically applied so that the oxidation treatment of the ions and the impurities and the reduction treatment are alternately performed. This makes it possible to accelerate regeneration of the ion-exchange resin and regeneration of the catalyst. Further, it is also possible to perform the refresh operation by applying, as the refresh voltage, a voltage whose value is equal to that of the electrolytic voltage at a time of the electrolysis operation. In this case, it is possible to simplify the configuration of the power controller 40.

Next, gas is supplied to the cathode flow path 21 and the anode flow path 12 (S204), to thereby dry the cathode 22 and the anode 11. When the rinse solution is supplied to the cathode flow path 21 and the anode flow path 12, a saturation degree of water in the gas diffusion layer 22A increases, and output reduction occurs due to the diffusibility of gas. By supplying the gas, the saturation degree of water lowers, so that the cell performance is recovered, and the refresh effect is increased. The gas is preferably supplied right after the rinse solution is made to flow, and is preferably supplied at least within five minutes after the finish of supply of the rinse solution. This is because the output reduction is large due to the increase in the saturation degree of water, and if it is assumed that the refresh operation is performed at intervals of one hour, for example, an output during the refresh operation in five minutes is 0 V or significantly small, so that 5/60 of the output is sometimes lost.

When the above refresh operation finishes, the cathode solution is introduced into the cathode flow path 21, the anode solution is introduced into the anode flow path 12, and $CO_2$ gas is introduced into the cathode flow path 23 (S205). Subsequently, the application of the electrolytic voltage between the anode 11 and the cathode 22 performed by the power controller 40 is resumed, to thereby resume the $CO_2$ electrolysis operation (S206). Note that when the application of the electrolytic voltage is not stopped in S201, the aforementioned resume operation is not performed. For the discharge of the cathode solution and the anode solution from each of the flow paths 12 and 21, gas may be used or the rinse solution may be used.

The supply and flow of the rinse solution (S203) are performed for the purpose of preventing precipitation of an electrolyte contained in the cathode solution and the anode solution, and washing the cathode 22, the anode 11, and each of the flow paths 12 and 21. For this reason, as the rinse solution, water is preferable, water having an electric conductivity of 1 mS/m or less is more preferable, and water having the electric conductivity of 0.1 mS/m or less is still more preferable. In order to remove a precipitate such as the electrolyte in the cathode 22, the anode 11, and the like, an acid rinse solution having a low concentration, of sulfuric acid, nitric acid, hydrochloric acid, or the like may be supplied, and the electrolyte may be dissolved by using the acid rinse solution. When the acid rinse solution having a low concentration is used, a step in which the rinse solution of water is supplied is performed in a step thereafter. It is preferable to perform, right before the gas supply step, the supply step of the rinse solution of water, in order to prevent an additive contained in the rinse solution from remaining. FIG. 1 illustrates the rinse solution supply system 720 having one rinse solution tank 721, but, when a plurality of rinse solutions such as water and the acid rinse solution are used, a plurality of rinse solution tanks 721 corresponding thereto are used.

In particular, for the refresh of the ion-exchange resin, acid or alkaline rinse solution is preferable. This provides an effect of discharging cations or anions substituted in place of protons or $OH^-$ in the ion-exchange resin. For this reason, it is preferable that the acid rinse solution and the alkaline rinse solution are made to flow alternately, the rinse solution is combined with water having an electric conductivity of 1 mS/m or less, and gas is supplied between supplies of a plurality of rinse solutions so that the rinse solutions are not mixed.

As the rinse solution, water produced through a reaction may also be used. For example, when CO is produced from $CO_2$ and protons through reduction, water is generated. It is also possible that the water discharged from the cathode 22 at this time is separated through gas/liquid separation, and stored to be used. If it is designed as above, there is no need to newly supply the rinse solution from the outside, which is advantageous in terms of system. Further, by changing an electric potential to increase a reaction current, and increasing an amount of water to be produced, the water may also be supplied to the cathode flow path 21. Accordingly, the tank for the produced water, and the pipe, the pump, and the like used for the rinse solution become unnecessary, which provides a configuration that is effective in terms of system. Further, it is also possible that gas containing oxygen is supplied to the cathode flow path 21 and a voltage is applied, to thereby perform water decomposition on the electrolytic solution or the rinse solution of the anode 11, and the refresh operation is performed by using water produced by the catalyst from protons or $OH^-$ ions moved to a counter electrode. For example, in a case where Nafion is used as an ion exchange membrane in an electrolysis cell in which $CO_2$ is reduced to CO by using a gold catalyst, when air is flowed through the cathode 22 and an electric potential is applied to the cell to perform water decomposition, protons moved to the cathode 22 are reacted with oxygen by the catalyst, and water is produced. The refresh operation can be performed by using the produced water. Further, it is also possible that hydrogen gas is generated by supplying gas containing no oxygen to the cathode 22 or stopping the supply of gas thereafter, and the generated hydrogen is used to perform the refresh operation to dry the cathode 22. Accordingly, it is also possible to perform the refresh operation of the catalyst by using reducing power of protons and hydrogen.

The gas used for the gas supply and the flow step S204 preferably contains at least one of air, carbon dioxide, oxygen, nitrogen, and argon. Moreover, gas having low chemical reactivity is preferably used. From such a point, air, nitrogen, and argon are preferably used, and nitrogen and argon are more preferable. The supply of the rinse solution and gas for refresh is not limited only to the cathode flow path 21 and the anode flow path 12, and in order to wash a surface, of the cathode 22, which is brought into contact with the cathode flow path 23, the rinse solution and the gas may be supplied to the cathode flow path 23. It is effective to supply the gas to the cathode flow path 23 in order to dry the cathode 22 also from the side of the surface which is brought into contact with the cathode flow path 23.

The above is the description regarding the case where the rinse solution and gas for refresh are supplied to both the anode part 10 and the cathode part 20, but, the rinse solution and gas for refresh may be supplied to only one of the anode part 10 and the cathode part 20. For example, the Faradaic efficiency of the carbon compound varies depending on a contact region between the cathode solution and $CO_2$ in the gas diffusion layer 22A and the cathode catalyst layer 22B of the cathode 22. In such a case, only by supplying the rinse solution and gas for refresh to only the cathode part 20, the Faradaic efficiency of the carbon compound is sometimes recovered. Depending on a type of the electrolytic solutions (anode solution and cathode solution) to be used, there is sometimes a tendency that precipitation easily occurs in one of the anode part 10 and the cathode part 20. In accordance with such a tendency of the electrolytic device 1, the rinse solution and gas for refresh may be supplied to only one of the anode part 10 and the cathode part 20. Moreover, depending on an operating time or the like of the electrolytic device 1, the cell performance is sometimes recovered only by drying the anode 11 and the cathode 22. In such a case, it is also possible to supply only the gas for refresh to at least one of the anode part 10 and the cathode part 20. The refresh operation step S105 can be changed in various ways according to an operation condition, a tendency, and the like of the electrolytic device 1.

As described above, in the electrolytic device 1 of the first embodiment, in accordance with whether or not the cell performance of the electrolysis cell 2 satisfies the request criteria, it is determined whether the $CO_2$ electrolysis operation step S102 is continued or the refresh operation step S105 is performed. By supplying the rinse solution and gas for refresh in the refresh operation step S105, the entry of the cathode solution into the gas diffusion layer 22A, the excess water of the cathode catalyst layer 22B, the deviation of the distribution of the ions and the residual gas in the vicinity of the anode 11 and the cathode 22, the precipitation of the electrolyte in the cathode 22, the anode 11, the anode flow path 12, and the cathode flow path 21, and the like, which become causes of reducing the cell performance, are removed. Therefore, by resuming the $CO_2$ electrolysis operation step S102 after the refresh operation step S105, the cell performance of the electrolysis cell 2 can be recovered. By repeating the $CO_2$ electrolysis operation step S102 and the refresh operation step S105 as above in accordance with the request criteria of the cell performance, it becomes possible to maintain the $CO_2$ electrolysis performance obtained by the electrolytic device 1 for a long period of time.

Second Embodiment

Figure 12:
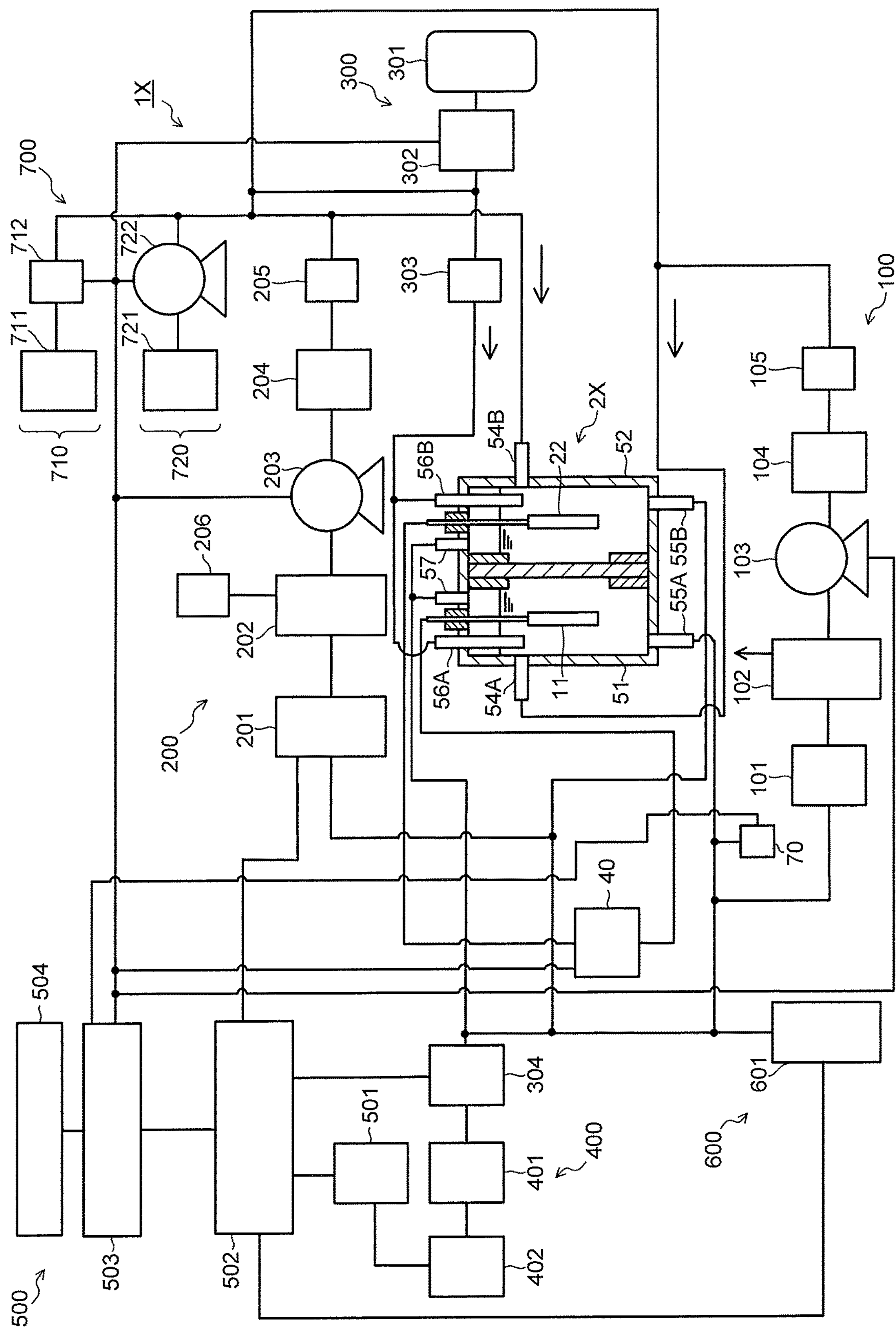
FIG. 12 is a view illustrating a carbon dioxide electrolytic device of a second embodiment.
Figure 13:
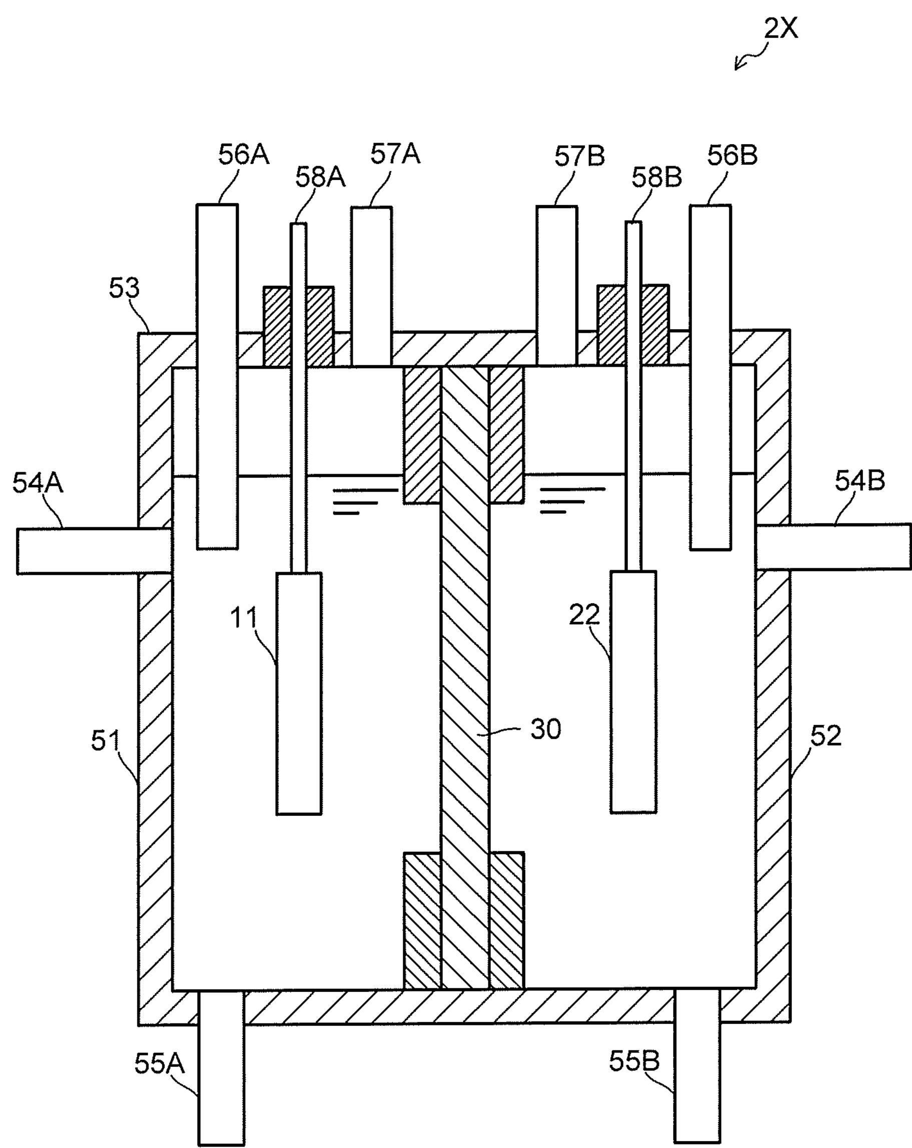
FIG. 13 is a sectional view illustrating an electrolysis cell of the carbon dioxide electrolytic device illustrated in FIG. 12.

FIG. 12 is a view illustrating a configuration of a carbon dioxide electrolytic device according to a second embodiment, and FIG. 13 is a sectional view illustrating a configuration of an electrolysis cell in the electrolytic device illustrated in FIG. 12. A carbon dioxide electrolytic device 1X illustrated in FIG. 12 includes an electrolysis cell 2X, an anode solution supply system 100 which supplies an anode solution to the electrolysis cell 2X, a cathode solution supply system 200 which supplies a cathode solution to the electrolysis cell 2X, a gas supply system 300 which supplies carbon dioxide ($CO_2$) gas to the electrolysis cell 2X, a product collection system 400 which collects a product produced by a reduction reaction in the electrolysis cell 2X, a control system 500 which detects a type and a production amount of the collected product, and performs control of the product and control of a refresh operation, a waste solution collection system 600 which collects waste solutions of the cathode solution and the anode solution, and a refresh material source 700 which recovers an anode, a cathode, or the like of the electrolysis cell 2X, similarly to the carbon dioxide electrolytic device 1 according to the first embodiment.

The carbon dioxide electrolytic device 1X illustrated in FIG. 12 basically includes a configuration similar to that of the electrolytic device 1 illustrated in FIG. 1 except that a configuration of the electrolysis cell 2X is different. The electrolysis cell 2X includes a reaction tank 53 having an anode solution tank 51, a cathode solution tank 52, and a separator 30 separating these anode solution tank 51 and the cathode solution tank 52 as illustrated in FIG. 13. The anode solution tank 51 has a solution inlet 54A and a solution discharge port 55A connected to the anode solution supply system 100, and a gas inlet 56A and a gas discharge port 57A. An anode solution is introduced from and discharged to the anode solution supply system 100 into/from the anode solution tank 51. An anode 11 is disposed in the anode solution tank 51 so as to be immersed in the anode solution. The anode 11 is connected via a current introduction portion 58A to a power supply 40.

The cathode solution tank 52 has a solution inlet 54B and a solution discharge port 55B connected to the cathode solution supply system 200, and a gas inlet 56B and a gas discharge port 57B connected to the gas supply system 300. A cathode solution is introduced from and discharged to the cathode solution supply system 200 into/from the cathode solution tank 52. Moreover, $CO_2$ gas is introduced from the gas supply system 300 into the cathode solution tank 52, and gas containing a gaseous product is sent to the product collection system 400. In order to increase solubility of the $CO_2$ gas in the cathode solution, the $CO_2$ gas is preferably released from the gas inlet 56B into the cathode solution. A cathode 22 is disposed in the cathode solution tank 52 so as to be immersed in the cathode solution. The cathode 22 is connected via a current introduction portion 58B to the power supply 40.

A gaseous substance supply system 710 of the refresh material source 700 is connected via pipes to the gas inlet 56A of the anode solution tank 51 and the gas inlet 56B of the cathode solution tank 52. A rinse solution supply system 720 of the refresh material source 700 is connected via pipes to the solution inlet 54A of the anode solution tank 51 and the solution inlet 54B of the cathode solution tank 52. The solution discharge port 55A of the anode solution tank 51 and the solution discharge port 55B of the cathode solution tank 52 are connected via pipes to the waste solution collection system 600. The gas discharge port 57A of the anode solution tank 51 and the gas discharge port 57B of the cathode solution tank 52 are connected via pipes to the waste solution collection system 600, and recovery via the waste solution collection system 600 into an not-illustrated waste gas collection tank or release to atmosphere is performed. Composing materials or the like of the respective parts are the same as those of the electrolytic device 1 of the first embodiment, and details are as described above.

In the electrolytic device 1X of the second embodiment, a start-up step S101 of the electrolytic device 1X and a $CO_2$ electrolysis operation step S102 are performed in a similar manner to the electrolytic device 1 of the first embodiment, except that supply patterns of the anode solution, the cathode solution, and the $CO_2$ gas are different. A determination step S103 regarding whether or not the request criteria of the cell performance are satisfied in accordance with concentration data from a sensor 70, or the like, is also performed in a similar manner to the electrolytic device 1 of the first embodiment. When it is determined that the cell performance does not satisfy the request criteria, a refresh operation step S105 is performed. In the electrolytic device 1X of the second embodiment, the refresh operation step S105 is performed as follows.

First, a $CO_2$ reduction reaction is stopped. Next, the anode solution and the cathode solution are discharged from the anode solution tank 51 and the cathode solution tank 52. At this time, application of an electrolytic voltage performed by the power controller 40 may be maintained or stopped. Next, a rinse solution is supplied from the rinse solution supply system 720 to the anode solution tank 51 and the cathode solution tank 52, to thereby wash the anode 11 and the cathode 22. While the rinse solution is supplied, a refresh voltage may be applied between the anode 11 and the cathode 22, in a similar manner to the first embodiment. Next, gas is supplied from the gaseous substance supply system 710 to the anode solution tank 51 and the cathode solution tank 52, to thereby dry the anode 11 and the cathode 22. The gas and rinse solution used for the refresh operation step S105 are similar to those in the first embodiment. When the above refresh operation finishes, the anode solution is introduced into the anode solution tank 51, the cathode solution is introduced into the cathode solution tank 52, and further the $CO_2$ gas is supplied in the cathode solution. Subsequently, the $CO_2$ electrolysis operation is resumed. When the application of the electrolytic voltage performed by the power controller 40 is stopped, the application is resumed. For the discharge of the cathode solution and the anode solution from each of the solution tanks 51 and 52, gas may be used or the rinse solution may be used. However, amounts of the cathode solution and the anode solution are larger than those in the first embodiment. In order to shorten a time for the refresh operation, the rinse solution is preferably supplied after discharging the solutions by using the gas.

In the electrolytic device 1X of the second embodiment, the refresh operation may be performed as follows. The current introduction portions 58 (58A, 58B) provided in an upper portion of the electrolysis cell 2X are detached, and the anode 11 and the cathode 22 are taken outside to be exposed from the anode solution and the cathode solution. Next, the anode 11 and the cathode 22 are immersed in the rinse solution to be washed. While they are immersed in the rinse solution, a refresh voltage is applied between the anode 11 and the cathode 22, in a similar manner to the first embodiment. Next, the anode 11 and the cathode 22 are taken out from the rinse solution and dried by spraying the gas. Next, the current introduction portions 58 (58A, 58B) are attached, and the anode 11 and the cathode 22 are immersed in the anode solution and the cathode solution. Subsequently, the $CO_2$ electrolysis operation is resumed. This omits the discharge and the introduction of the anode solution and the cathode solution from/into the anode solution tank 51 and the cathode solution tank 52, which make it possible to shorten a time for the refresh operation.

Also in the electrolytic device 1X of the second embodiment, in accordance with whether or not the cell performance of the electrolysis cell 2X satisfies the request criteria, it is determined whether the $CO_2$ electrolysis operation is continued or the refresh operation is performed. By supplying the rinse solution and the gas in the refresh operation step, the deviation of the distribution of the ions and the residual gas in the vicinity of the anode 11 and the cathode 22, which becomes causes of reducing the cell performance, is solved, and the precipitation of the electrolyte in the anode 11 and the cathode 22 and the like are removed. Therefore, by resuming the $CO_2$ electrolysis operation after the refresh operation step, the cell performance of the electrolysis cell 2X can be recovered. By repeating the $CO_2$ electrolysis operation and the refresh operation in accordance with the request criteria of the cell performance, it becomes possible to maintain the $CO_2$ electrolysis performance obtained by the electrolytic device 1X for a long period of time.

Third Embodiment

Figure 14:
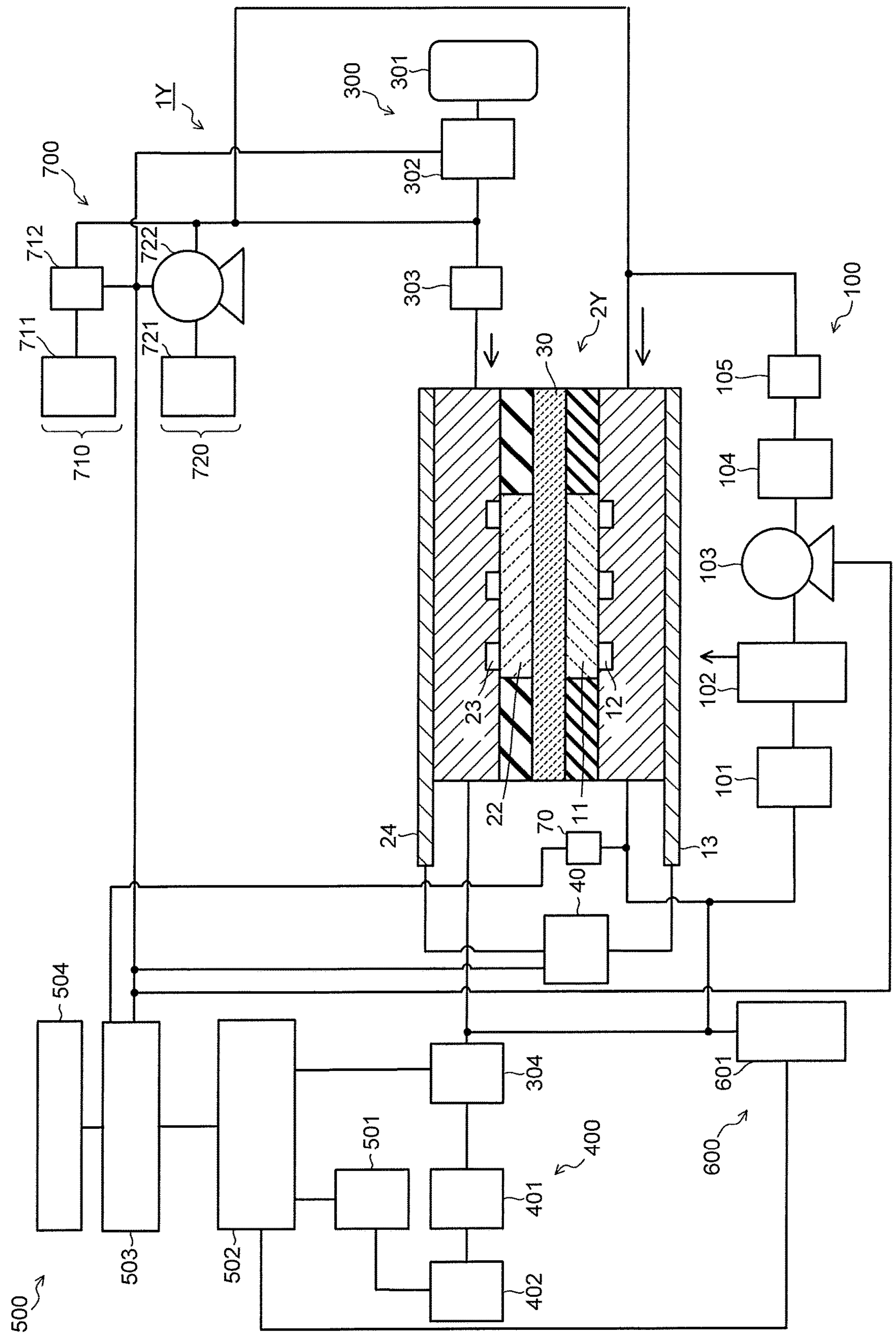
FIG. 14 is a view illustrating a carbon dioxide electrolytic device of a third embodiment.
Figure 15:
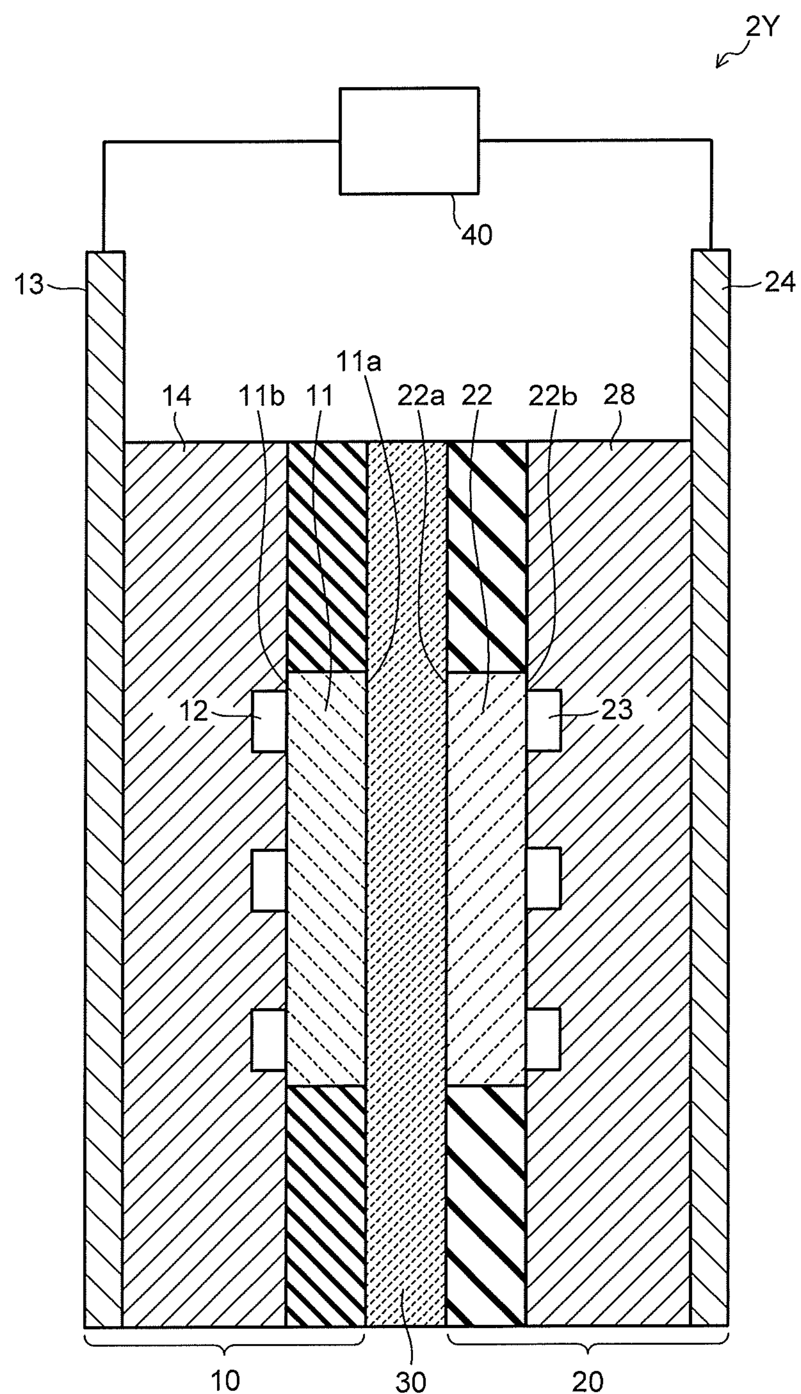
FIG. 15 is a sectional view illustrating an electrolysis cell of the carbon dioxide electrolytic device illustrated in FIG. 14.

FIG. 14 is a view illustrating a configuration of a carbon dioxide electrolytic device according to a third embodiment, and FIG. 15 is a sectional view illustrating a configuration of an electrolysis cell in the electrolytic device illustrated in FIG. 14. A carbon dioxide electrolytic device 1Y illustrated in FIG. 14 includes an electrolysis cell 2Y, an anode solution supply system 100 which supplies an anode solution to the electrolysis cell 2Y, a gas supply system 300 which supplies carbon dioxide ($CO_2$) gas to the electrolysis cell 2Y, a product collection system 400 which collects a product produced by a reduction reaction in the electrolysis cell 2Y, a control system 500 which detects a type and a production amount of the collected product, and performs control of the product and control of a refresh operation, a waste solution collection system 600 which collects a waste solution of the anode solution, and a refresh material source 700 which recovers an anode, a cathode, or the like of the electrolysis cell 2Y, similarly to the carbon dioxide electrolytic device 1 according to the first embodiment.

The carbon dioxide electrolytic device 1Y illustrated in FIG. 14 basically includes a configuration similar to that of the electrolytic device 1 illustrated in FIG. 1, except that a configuration of the electrolysis cell 2Y is different and a cathode solution supply system 200 is not included. As illustrated in FIG. 15, the electrolysis cell 2Y includes an anode part 10, a cathode part 20, and a separator 30. The anode part 10 includes an anode 11, an anode flow path 12, and an anode current collector 13. The cathode part 20 includes a cathode 22, a cathode flow path 23, and a cathode current collector 24. The power controller 40 is connected via a current introduction member to the anode 11 and the cathode 22.

The anode 11 preferably has a first surface 11*a* which is brought into contact with the separator 30, and a second surface 11*b* which faces the anode flow path 12. The first surface 11*a* of the anode 11 is brought into close contact with the separator 30. The anode flow path 12 is formed of a pit (groove portion/concave portion) provided in a flow path plate 14. The anode solution flows through inside the anode flow path 12 so as to be brought into contact with the anode 11. The anode current collector 13 is electrically brought into contact with a surface on a side opposite to the anode 11 of the flow path plate 14 forming the anode flow path 12. The cathode 22 has a first surface 22*a* which is brought into contact with the separator 30, and a second surface 22*b* which faces a cathode flow path 23. The cathode flow path 23 is formed of a pit (groove portion/concave portion) provided in a flow path plate 28. A cathode current collector 24 is electrically brought into contact with a surface on a side opposite to the cathode 22 of a flow path plate 28 forming the cathode flow path 23.

A gaseous substance supply system 710 and a rinse solution supply system 720 of a refresh material source 700 are connected via pipes to the anode flow path 12 and the cathode flow path 23. The anode flow path 12 and the cathode flow path 23 are connected via pipes to a waste solution collection system 600. A rinse solution discharged from the anode flow path 12 and a $CO_2$ gas flow path is collected in a waste solution collection tank 601 of the waste solution collection system 600. Gas for refresh discharged from the anode flow path 12 and the $CO_2$ gas flow path is collected via the waste solution collection system 600 in a not-illustrated waste gas collection tank, or discharged into the atmosphere. Composing materials of the respective parts, or the like are similar to those of the electrolytic device 1 of the first embodiment, and details thereof are as described above.

In the electrolytic device 1Y of the third embodiment, a start-up step S101 of the electrolytic device 1Y and a $CO_2$ electrolysis operation step S102 are performed in a similar manner to the electrolytic device 1 of the first embodiment, except that supply of a cathode solution is not performed. Note that a reduction reaction of $CO_2$ in the cathode 22 is performed between $CO_2$ supplied from the cathode flow path 23 and the anode solution permeated the cathode 22 via the separator 30. A determination step S103 regarding whether or not the request criteria of the cell performance are satisfied in accordance with concentration data from a sensor 70, or the like, is also performed in a similar manner to the electrolytic device 1 of the first embodiment. When it is determined that the cell performance does not satisfy the request criteria, a refresh operation step S105 is performed. In the electrolytic device 1Y of the third embodiment, the refresh operation step S105 is performed as follows.

First, a $CO_2$ reduction reaction is stopped. At this time, application of an electrolytic voltage performed by the power controller 40 may be maintained or stopped. Next, the anode solution is discharged from the anode flow path 12. Next, a rinse solution is supplied from the rinse solution supply system 720 to the anode flow path 12 and the cathode flow path 23, to thereby wash the anode 11 and the cathode 22. While the rinse solution is supplied, a refresh voltage may be applied between the anode 11 and the cathode 22, in a similar manner to the first embodiment. Next, gas is supplied from the gaseous substance supply system 710 to the anode flow path 12 and the cathode flow path 23, to thereby dry the anode 11 and the cathode 22. The gas and the rinse solution used for the refresh operation step are similar to those in the first embodiment. When the above refresh operation finishes, the anode solution is introduced into the anode flow path 12, and $CO_2$ gas is introduced into the cathode flow path 23. Subsequently, the $CO_2$ electrolysis operation is resumed. When the application of the electrolytic voltage performed by the power controller 40 is stopped, the application is resumed.

Also in the electrolytic device 1Y of the third embodiment, in accordance with whether or not the cell performance of the electrolysis cell 2Y satisfies the request criteria, it is determined whether the $CO_2$ electrolysis operation is continued or the refresh operation is performed. By supplying the rinse solution and the gas in the refresh operation step, the deviation of the distribution of the ions in the vicinity of the anode 11 and the cathode 22, which becomes causes of reducing the cell performance, is solved, and the excess water in the cathode 22, the precipitation of the electrolyte in the anode 11 and the cathode 22, the flow path block thereby, and the like are removed. Therefore, by resuming the $CO_2$ electrolysis operation after the refresh operation step, the cell performance of the electrolysis cell 2Y can be recovered. By repeating the $CO_2$ electrolysis operation and the refresh operation as above in accordance with the request criteria of the cell performance, it becomes possible to maintain the $CO_2$ electrolysis performance obtained by the electrolytic device 1Y for a long period of time.

When liquid passes through the separator 30 at a relatively low pressure, for example, a hydrophilic polytetrafluoroethylene (PTFE) porous body or the like is used, the rinse solution is supplied to only the anode flow path 12, and a pressure is applied to the liquid at an anode outlet by using a not-illustrated valve or the like or the anode outlet is blocked. Accordingly, the rinse solution passes through the separator 30, flows into the cathode 22, and the rinse solution flows out from a discharge port of the cathode 22. This makes it possible to perform the refresh of the cathode 22 and the refresh of the anode 11 at the same time. This configuration eliminates the necessity of the device which makes the rinse solution flow through the cathode 22, so that the device becomes compact in size, and further, the system is simplified, which is preferable.

Note that a pipe through which air gas is introduced into the cathode 22 may be connected to the cathode 22. At a time of the refresh, it is also possible that gas containing air is supplied to the cathode 22, and a refresh voltage is applied between the anode 11 and the cathode 22, to thereby cause a water electrolysis reaction. On the anode 11 side, oxygen is generated by an oxidation catalyst, and generated protons move through the separator 30 or an electrolyte membrane to the cathode 22. In the cathode 22, the protons and oxygen in the air are reacted by a cathode catalyst, resulting in that water is produced. By using the produced water, salts in the cathode can be dissolved to be discharged. Further, the produced water is pure water, so that it can be used to wash the cathode 22. At this time, impurities in the cathode 22 can be subjected to reduction treatment by using the protons moved to the cathode 22, and it is possible to regenerate the catalyst and the members. This configuration eliminates the necessity of the device which supplies the rinse solution to the cathode 22, so that the device becomes compact in size, and further, the system is simplified, which is preferable. Further, when, before the flow of the $CO_2$ gas to be performed thereafter, the air flowed through the cathode is stopped, the generated protons react with each other to generate hydrogen, which also enables to push out generated water. The oxygen-containing gas is stopped before performing push with $CO_2$, and a regeneration function of the catalyst and the members provided by the protons can become more effective. This is because other catalysts which are difficult to be reduced and the respective members of the cathode 22 are reduced, due to the absence of oxygen. Concretely, there can be cited organic matters of impurities, metal oxides, and the like. When $CO_2$ is supplied thereafter to cause a reaction, it is possible to further expect a refresh effect.

Figure 16:
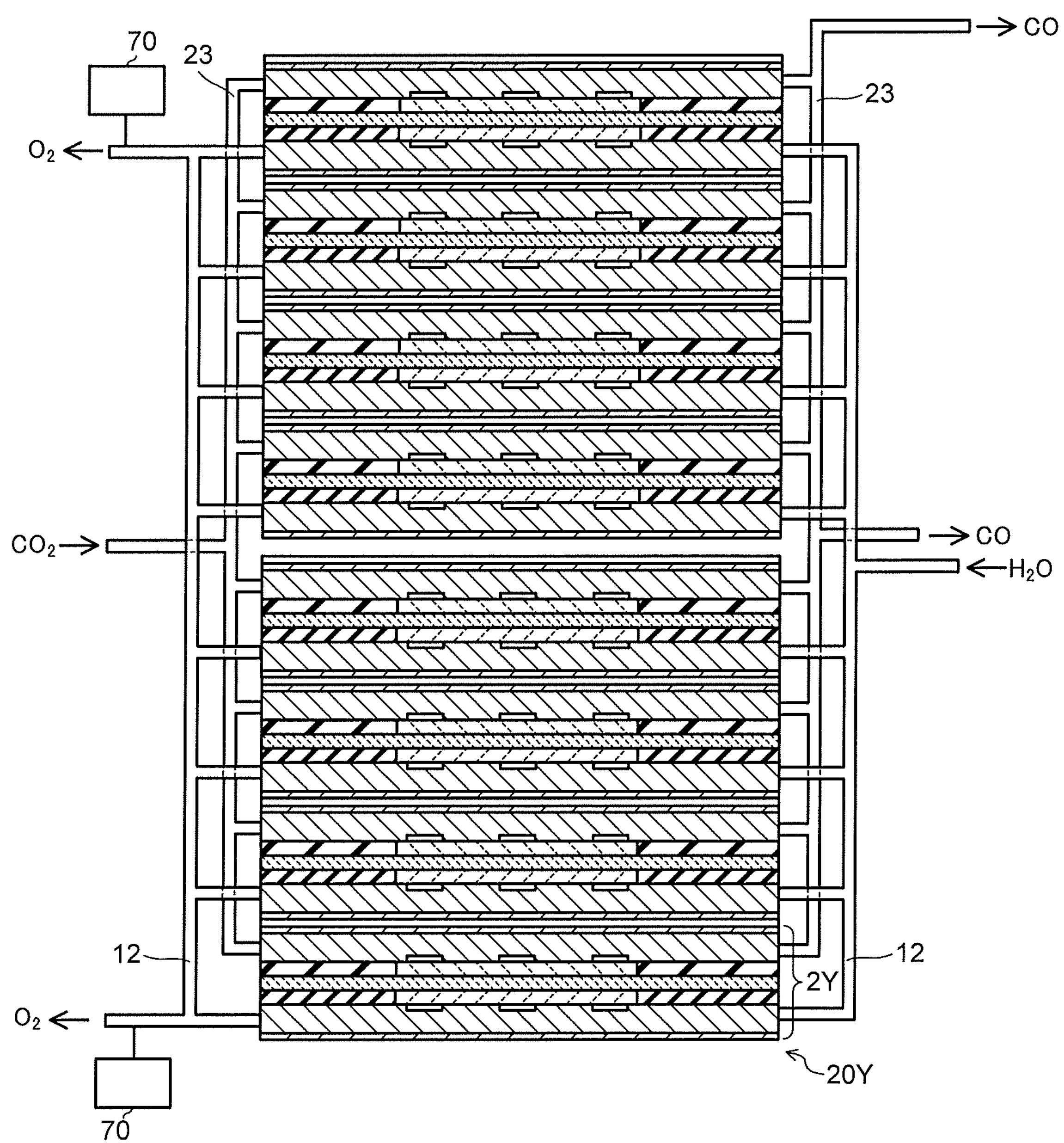
FIG. 16 is a view illustrating an example of a structure.

The electrolytic device 1Y may have a structure in which a plurality of the electrolysis cells 2Y are stacked. FIG. 16 is a view illustrating an example of the structure. FIG. 16 illustrates a stack 20Y of the electrolysis cells 2Y. A plurality of the stacks 20Y may be provided. At this time, the plurality of electrolysis cells 2Y may be connected in parallel by using anode flow paths 12 and cathode flow paths 23. Providing a sensor 70 for each electrolysis cell 2Y makes it possible to detect a crossover amount, a leak, and the like for each electrolysis cell 2Y. However, when the number of stacks is large, the number of sensors becomes large, which causes the problems of a rise in cost, a large system, and the like. Accordingly, as illustrated in FIG. 16, it is preferable to provide the sensors 70 for the electrolysis cells 2 at ends of the stack 20Y, perform data collection of the electrolysis cells 2Y corresponding to several pieces from each of the electrolysis cells 2Y at the ends which are susceptible to temperature and the like, and provide the sensor 70 every several cells in the middle portion. Further, it is preferable from the viewpoints of the costs and the system to allow the number of the sensors 70 to be reduced to two or three pieces by providing them only at the ends and in the middle portion or by dividing the stack 20Y into two or three sections. Only one sensor 70 may be provided for each stack 20Y, but because the cells at the ends are affected by external environment, robustness of the cells is required to be enhanced due to a difference in cell conditions such as low temperature.

EXAMPLES

Example 1

An electrolytic device illustrated in FIG. 1 was fabricated, and an electrolysis performance of carbon dioxide was examined. First, on a carbon paper provided with a porous layer, a cathode to which carbon particles on which gold nanoparticles were supported were applied was produced by the following procedure. A coating solution in which the carbon particles on which the gold nanoparticles were supported, pure water, a Nafion solution, and ethylene glycol were mixed was produced. An average particle diameter of the gold nanoparticles was 8.7 nm, and a supported amount thereof was 18.9 mass %. The coating solution was filled in an air brush, and spray-coated on the carbon paper provided with the porous layer, by using Ar gas. After the coating, washing was performed by flowing pure water for 30 minutes, and thereafter, the organic matter such as ethylene glycol was oxidized to be removed through immersion in a hydrogen peroxide solution. This was cut into a size of 2×2 cm to be set as the cathode. Note that a coating amount of Au was estimated as about 0.2 mg/$cm^2$ from a mixing amount of the gold nanoparticles and the carbon particles in the coating solution. For an anode, an electrode in which $IrO_2$ nanoparticles to be a catalyst were applied to Ti mesh was used. As the anode, one in which $IrO_2$/Ti mesh was cut into 2×2 cm was used.

As illustrated in FIG. 2, the electrolysis cell 2 was produced in a manner that the cathode current collector 24, the cathode flow path 23 (the third flow path plate 28), the cathode 22, the cathode flow path 21 (the second flow path plate 25), the separator 30, the anode 11, and the anode flow path 12 (the anode current collector 13) were stacked in this order from the top, the stack was sandwiched by the not-illustrated support plates, and tightened by the bolts. For the separator 30, a PTFE porous body (product name: POREFLON, manufactured by Sumitomo Electric Industries, Ltd.) after being subjected to hydrophilic treatment was used. The $IrO_2$/Ti mesh of the anode 11 was brought into close contact with the PTFE porous body. A thickness of the cathode flow path 21 was set to 1 mm. Note that an evaluation temperature was set to room temperature.

The electrolytic device 1 illustrated in FIG. 1 was fabricated using the above-described electrolysis cell 2, and the electrolytic device was operated under the following conditions. $CO_2$ gas was supplied to the cathode flow path 23 of the electrolysis cell 2 at 20 sccm, and an aqueous potassium hydroxide solution (concentration 1 M KOH) was introduced into the cathode solution flow path at a flow rate of 5 mL/min. Next, by controlling a voltage with the use of the power controller, a constant current of 600 mA was made to flow between the anode 11 and the cathode 22 at a constant current density of 150 mA/$cm_2$, an electrolytic reaction of $CO_2$ was caused, and a cell voltage at that time was measured, and collected by the data collection and controller. Further, a part of gas output from the cathode flow path 23 was collected, and production amounts of CO gas produced by a reduction reaction of $CO_2$ and $H_2$ gas produced by a reduction reaction of water were analyzed by a gas chromatograph. In the data collection and controller, in accordance with the gas production amounts, a partial current density of CO or $H_2$, and Faradaic efficiency being a ratio between the entire current density and the partial current density were calculated and collected. Similarly, a production amount of CO or $H_2$ gas in the anode solution flow path was analyzed by the gas chromatograph.

After starting the operation, the Faradaic efficiency of CO became 80% after 60 minutes and a reduction in efficiency was confirmed. When a CO concentration in the vicinity of an outlet of the anode flow path 12 was detected by a sensor 70, a value thereof was about 2 times as large as an initial value thereof, so that it was judged that salts precipitated. This was able to be confirmed also in accordance with an increase of a pressure in the cathode flow path to 1.2 times as much as an initial pressure therein. When the cell was disassembled at this stage under the same condition by using the same cell, it was possible to visually confirm precipitation of salts into a flow path. Accordingly, pure water was made to flow through the cathode flow path 21 of the electrolysis cell 2 to wash the cathode flow path 21. Thereafter, when the aqueous potassium hydroxide solution (concentration 1 M KOH) was made to flow through the cathode flow path 21 and the anode flow path 12 and the $CO_2$ electrolytic reaction was resumed, the Faradaic efficiency of CO was 84%, and a recovery of a cell output owing to the washing was confirmed. In addition, the value of the CO concentration in the anode flow path 12 indicated a value similar to the initial value, and it was confirmed that the salts were dissolved to be discharged. Moreover, the pressure in the cathode flow path also returned to the initial pressure. Note that when the cell was disassembled under the same condition by using the same cell, precipitation of salts was not confirmed in a flow path. Moreover, the reaction was continued, and the Faradaic efficiency of CO became 80% after another 60 minutes. After starting the operation, a CO concentration at an outlet of the anode flow path 12 was 1.5 times as high as the initial concentration after 41 minutes, but a value of the pressure in the cathode flow path 21 was almost equal to the initial value at this moment, and a pressure gauge failed to sense a difference between the values. It is considered from the above that it is also possible to be aware of the precipitation of salts beforehand.

Example 2

The Faradaic efficiency and the like were measured under the same conditions as those in Example 1 except that a water of 1 cc was made to flow through the cell at intervals of one hour as a refresh operation and continuous operation was performed. After starting the operation, a value of a CO concentration detected at the outlet of the anode flow path 12 after the refresh after 100 hours was 1.5 times as large as an initial value thereof. A cell resistance at this time increased from 100 mΩ of an initial value thereof to 250 mΩ. Further, a cell voltage increased to 2.5 V with respect to 2.2 V of an initial value thereof, and electrolysis efficiency decreased. When this cell was disassembled and membrane resistance of the separator 30 (Selemion) under the condition of being immersed in KOH was examined, the membrane resistance increased from 27 mΩ of an initial value thereof to 181 mΩ. Accordingly, by disassembling the cell and exchanging Selemion, the cell resistance returned to 100 mΩ of the initial value, and performance of the cell also returned to an initial state. Thereafter, a cell resistance at that time increased from 100 mΩ of the initial value to 250 mΩ similarly after 100 hours. Further, a cell voltage increased to 2.5 V with respect to 2.2 V of the initial value, and the electrolysis efficiency decreased.

Comparative Example 1

The Faradaic efficiency and the like were measured under the same conditions as those in Example 1 except that a water of 1 cc was made to flow through the cell at intervals of one hour as a refresh operation and continuous operation was performed. After starting the operation, a cell resistance increased from 100 mΩ of an initial value thereof to 250 mΩ after 100 hours, and a cell voltage increased to 2.5 V with respect to 2.2 V of an initial value thereof, and the electrolysis efficiency decreased. The electrolysis operation was further continued, the cell voltage increased to 2.65 V after 150 hours and to 2.78 V after 200 hours, the Faradaic efficiency also decreased to 62%, and the electrolysis efficiency significantly decreased.

Example 3

The Faradaic efficiency and the like were measured similarly to Example 1 except that the one obtained by punching a hole of 0.1 mm in a separator formed by subjecting a PTFE porous body to hydrophilic treatment (a thickness of 60 μm, a pore size of 0.1 μm) was used in place of Selemion for the purpose of recreating a leak in a simulated manner. After starting the operation, a value of a CO concentration detected at the anode outlet after the refresh after two minutes was about 1.5 times as large as an initial value thereof. The value of the CO concentration increased to 2.7 times as much as the initial value after three minutes. Due to a rapid increase of a crossover amount, it was judged that the separator was broken. For example, the electrolysis operation of the electrolysis cell 2 can be stopped by setting the aforementioned CO concentration as a request criterion.

Comparative Example 2

The Faradaic efficiency and the like were measured similarly to Example 1 by using a separator similar to that in Example 3 except that a CO concentration was not measured. After starting the operation, a cell voltage increased to 2.7 V with respect to 2.2 V of an initial value thereof after ten minutes, and the Faradaic efficiency was below 90% in a total of hydrogen and CO in measurement by using the gas chromatograph. When the measurement was performed after another 10 minutes, the cell voltage increased to 2.8 V, and the Faradaic efficiency was below 80% in a total of hydrogen and CO. Because this was likely to occur even during normal cell operation, it was not possible to judge the breakage of the separator 30 only in accordance with this. After another ten minutes, due to an increase of a movement amount of the anode solution to the cathode flow path 23, it was estimated that the separator 30 was highly likely to be broken, but, because a similar phenomenon occurred even in a liquid movement amount due to a reduction in gas/liquid separation caused by flooding in the cathode flow path 21, it was not possible to judge the breakage of the separator 30. However, it is judged from a combination of these values that the separator 30 is highly likely to be broken, and the cell can be stopped for safety. However, there can also be a case where the separator 30 is not broken.

As can be seen from Examples 1 to 3 and Comparative examples 1 and 2, it is found that performing the refresh operation in accordance with data of the CO concentration or the $H_2$ concentration in the anode flow path 12 makes it possible to improve the current density, the Faradaic efficiency of CO, the Faradaic efficiency of $H_2$, and the like. This indicates that the cell performance can be maintained for a longer period of time than the conventional one.

Note that configurations of the above-described respective embodiments may be each applied in combination, and further may be partially substituted. Herein, while certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

What is claimed is:

1. A carbon dioxide electrolytic device, comprising:
an electrolysis cell including
a cathode to reduce a first substance containing carbon dioxide and thus produce a first product containing a carbon compound,
an anode to oxidize a second substance containing water or hydroxide ions and thus produce a second product containing oxygen,
a cathode flow path facing the cathode,
an anode flow path facing the anode, and
a separator separating the anode and the cathode;
a carbon dioxide source to supply the carbon dioxide to the cathode flow path;
a solution source to supply an electrolytic solution containing the water or hydroxide ions to the anode flow path;
a sensor to acquire data indicating a concentration of the first product in the anode flow path;
a power controller to apply a voltage between the anode and the cathode;
a refresh material source including
a gas source to supply a gaseous substance to at least one selected from the group consisting of the anode and cathode flow paths, and
a solution supply source to supply a rinse solution to at least one selected from the group consisting of the anode and cathode flow paths; and
a controller programmed to stop the supply of the carbon dioxide and the electrolytic solution and supply the rinse solution to at least one selected from the group consisting of the anode and cathode flow paths from the refresh material source, in accordance with the data.

2. The device according to claim 1, wherein:
the anode flow path has an outlet; and
the data indicates the concentration of the first product at the outlet.

3. The device according to claim 1, wherein
the sensor is provided outside the anode flow path.

4. The device according to claim 1, wherein
the carbon compound is carbon monoxide.

5. The device according to claim 1, wherein:
the first substance further contains water; and
the first product further contains hydrogen.

6. The device according to claim 1, wherein
the controller is programmed to stop the supply of the carbon dioxide and the electrolytic solution and apply a voltage between the anode and the cathode from the power controller while supplying the rinse solution to at least one selected from the group consisting of the anode and cathode flow paths from the refresh material source, in accordance with the data.

7. The device according to claim 1, wherein
the solution source includes
a first solution supply source to supply an acid rinse solution to at least one selected from the group consisting of the anode and cathode flow paths, and
a second solution supply source to supply water to at least one selected from the group consisting of the anode and cathode flow paths.

8. The device according to claim 1, wherein
the controller is programmed to control the refresh material source to supply the rinse solution from the solution supply source and the gaseous substance from the gas source to at least one selected from the group consisting of the anode and cathode flow paths exposed from the electrolytic solution.

9. The device according to claim 1, further comprising a flow rate controller to be controlled by the controller and adjust a flow rate of at least one selected from the group consisting of the rinse solution and the gaseous substance.

10. The device according to claim 1, wherein the gaseous substance contains at least one selected from the group consisting of air, carbon dioxide, oxygen, nitrogen, and argon.

11. The device according to claim 1, wherein the electrolysis cell further includes a cathode solution tank to store a cathode solution as the electrolytic solution in which the cathode is immersed, and an anode solution tank to store an anode solution as the electrolytic solution in which the anode is immersed.

12. The device according to claim 1, wherein the cathode and the anode are provided on the separator.

13. The device according to claim 1, wherein:

the electrolysis cell further includes a second cathode flow path provided between the cathode and the separator; and the solution source is configured to supply an anode solution as the electrolytic solution to the anode flow path, and supply a cathode solution as the electrolytic solution to the second cathode flow path.

14. A method of electrolyzing carbon dioxide, comprising:

supplying carbon dioxide to a cathode flow path facing a cathode to reduce a first substance containing the carbon dioxide and thus produce a first product containing a carbon compound, and supplying an electrolytic solution containing water to an anode flow path facing an anode to oxidize a second substance containing water or hydroxide ions and thus produce a second product containing oxygen;

applying a voltage between the cathode and the anode to reduce the first substance and thus produce the first product on the cathode, and to oxidize the second substance and thus produce the second product on the anode;

acquiring data indicating a concentration of the first product in the anode flow path; and stopping the supply of the carbon dioxide and the electrolytic solution, and supplying a rinse solution to at least one selected from the group consisting of the anode and cathode flow paths, in accordance with the data.

15. The method according to claim 14, further comprising:

discharging the rinse solution; and supplying a gaseous substance to at least one selected from the group consisting of the anode and cathode flow paths after discharging the rinse solution.

* * * * *